United States Patent
Chen et al.

(10) Patent No.: US 10,706,072 B2
(45) Date of Patent: *Jul. 7, 2020

(54) DATA REPLICATION METHOD AND STORAGE SYSTEM

(71) Applicant: HUAWEI TECHNOLOGIES CO., LTD., Shenzhen, Guangdong (CN)

(72) Inventors: Yijia Chen, Chengdu (CN); Ji Ouyang, Chengdu (CN); Peijun Jiang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/721,240

(22) Filed: Dec. 19, 2019

(65) Prior Publication Data

US 2020/0125583 A1 Apr. 23, 2020

Related U.S. Application Data

(63) Continuation of application No. 15/177,877, filed on Jun. 9, 2016, now Pat. No. 10,545,994, which is a
(Continued)

(51) Int. Cl.
*G06F 16/27* (2019.01)
*G06F 11/20* (2006.01)
*G06F 3/06* (2006.01)

(52) U.S. Cl.
CPC ............ *G06F 16/273* (2019.01); *G06F 3/061* (2013.01); *G06F 3/065* (2013.01); *G06F 3/067* (2013.01);
(Continued)

(58) Field of Classification Search
CPC ............ G06F 11/2074; G06F 11/2094; G06F 11/2097; G06F 17/30578; G06F 3/065; G06F 3/067
(Continued)

(56) References Cited

U.S. PATENT DOCUMENTS 6,981,177 B2 12/2005 Beattie
7,734,884 B1 * 6/2010 Marshak ............ H04L 67/1095
711/162
(Continued)

FOREIGN PATENT DOCUMENTS

CN 101038565 9/2007
CN 101067796 11/2007
(Continued)

*Primary Examiner* — Angelica Ruiz
(74) *Attorney, Agent, or Firm* — Fish & Richardson P.C.

(57) ABSTRACT

A data replication method and a storage system are provided. The method is applied to a storage system including a first storage device and a second storage device. According to the method, after determining replication information, a first storage system determines a first replication sub-information and a second replication sub-information according to the replication information, where the replication information is used to indicate data that needs to be replicated by the first storage system to a second storage system in a current replication task. Then, the first storage device replicates data to the second storage system according to the second replication sub-information, and the second storage device replicates data to the second storage system according to the second replication sub-information. According to the data replication method, efficiency of replication performed between the first storage system and the second storage system can be improved.

20 Claims, 11 Drawing Sheets

Related U.S. Application Data continuation of application No. PCT/CN2013/089176, filed on Dec. 12, 2013.

(52) U.S. Cl.
CPC ...... *G06F 11/2074* (2013.01); *G06F 11/2094* (2013.01); *G06F 11/2097* (2013.01)

(58) Field of Classification Search
USPC ........... 707/600–831, 899, 999.001–999.206
See application file for complete search history.

(56) References Cited

U.S. PATENT DOCUMENTS

| | | | |
|---|---|---|---|
| 7,765,187 B2 * | 7/2010 | Bergant | G06F 11/1435 707/614 |
| 8,135,930 B1 | 3/2012 | Mattox et al. | |
| 8,271,447 B1 | 9/2012 | Natanzon et al. | |
| 2003/0126388 A1 | 7/2003 | Yamagami | |
| 2003/0217119 A1 * | 11/2003 | Raman | H04L 67/1095 709/219 |
| 2004/0230756 A1 | 11/2004 | Achiwa et al. | |
| 2007/0143371 A1 | 6/2007 | Kottomtharayil | |
| 2007/0220223 A1 | 9/2007 | Boyd et al. | |
| 2008/0126853 A1 | 5/2008 | Callaway | |
| 2009/0030986 A1 | 1/2009 | Bates | |
| 2011/0191628 A1 | 8/2011 | Noguchi et al. | |
| 2012/0069131 A1 * | 3/2012 | Abelow | G06Q 10/067 348/14.01 |
| 2013/0036098 A1 | 2/2013 | Mutalik et al. | |
| 2013/0325803 A1 | 12/2013 | Akirav et al. | |
| 2016/0292250 A1 | 10/2016 | Chen et al. | |

FOREIGN PATENT DOCUMENTS

| | | |
|---|---|---|
| CN | 101656624 | 2/2010 |
| CN | 101809558 | 8/2010 |
| CN | 102236588 | 9/2011 |
| CN | 102306115 | 1/2012 |
| CN | 102567145 | 7/2012 |
| EP | 1632843 | 3/2006 |

* cited by examiner

DATA REPLICATION METHOD AND STORAGE SYSTEM

CROSS-REFERENCE TO RELATED APPLICATIONS

This application is a continuation of U.S. patent application Ser. No. 15/177,877, filed on Jun. 9, 2016, which is a continuation of International Application No. PCT/CN2013/089176, filed on Dec. 12, 2013. All of the aforementioned patent applications are hereby incorporated by reference in their entireties.

TECHNICAL FIELD

The present disclosure relates to the field of storage technologies, and in particular, to a data replication method and a storage system.

BACKGROUND

To protect security of data, and for an objective of disaster recovery, storage vendors establish a remote disaster recovery center to implement remote data backup, so as to ensure that original data is not lost or damaged after a disaster (such as a fire and an earthquake) occurs, and to ensure that a key service resumes within an allowed time range, thereby reducing a loss caused by the disaster as much as possible.

Current disaster recovery systems mainly include: a 2 center disaster recovery system and a 3 data center (3DC) disaster recovery system. In the 2 center disaster recovery system, disaster recovery is implemented by establishing two data centers, where an active data center is used to undertake a service of a user, and a standby data center is used to back up data, a configuration, a service, and the like of the active data center. When a disaster occurs in the active data center, the standby data center may take over the service of the active data center. In the 3DC disaster recovery system, disaster recovery is implemented by using storage systems deployed at the three data centers. Generally, in the 3DC disaster recovery system, the three data centers may be respectively referred to as a production site, a level-1 site, and a level-2 site. Generally, the level-1 site and the level-2 site are disaster recovery sites, the production site and the level-1 site may be located in two different locations in a same city, and the level-2 site and the production site are located in different cities. In an existing 3DC disaster recovery system, disaster recovery is generally implemented among the three data centers by using a synchronous remote replication technology and an asynchronous remote replication technology. Because reliability and scalability of the 3DC disaster recovery system are relatively good, a scope of application of the 3DC disaster recovery system is wider.

However, in the existing 3DC redundancy system, when data needs to be replicated to a level-2 site, generally, a production site or a level-1 site replicates the data to the level-2 site; therefore, data replication efficiency is not high.

SUMMARY

A data replication method and a storage system provided by embodiments of the present disclosure can improve replication efficiency.

According to a first aspect, an embodiment of the present disclosure provides a data replication method, where the method is applied to a storage system including at least a first storage device and a second storage device, and the method includes:

determining, by a first storage system, replication information, where the replication information is used to indicate data that needs to be replicated by the first storage system to a second storage system in a current replication task, the first storage device and the second storage device that are in the first storage system store same data, and the first storage system and the second storage system implement data backup by using an asynchronous replication technology;

determining, by the first storage system, first replication sub-information and second replication sub-information according to the replication information, where the first replication sub-information is used to indicate data that needs to be replicated by the first storage device to the second storage system in the current replication task, the second replication sub-information is used to indicate data that needs to be replicated by the second storage device to the second storage system in the current replication task, and the data indicated by the first replication sub-information is different from the data indicated by the second replication sub-information;

replicating, by the first storage device to the second storage system according to the first replication sub-information, the data that needs to be replicated by the first storage device to the second storage system; and replicating, by the second storage device to the second storage system according to the second replication sub-information, the data that needs to be replicated by the second storage device to the second storage system.

In a first possible implementation manner of the first aspect, the replicating, by the first storage device to the second storage system according to the first replication sub-information, the data that needs to be replicated by the first storage device to the second storage system includes:

replicating, by the first storage device to a destination data volume in the second storage system according to the first replication sub-information, the data that needs to be replicated by the first storage device to the second storage system and that is stored in a first source data volume; and replicating, by the second storage device to the destination data volume in the second storage system according to the second replication sub-information, the data that needs to be replicated by the second storage device to the second storage system and that is stored in a second source data volume, where data stored in the first source data volume is the same as data stored in the second source data volume.

With reference to the first possible implementation manner of the first aspect, in a second possible implementation manner of the first aspect, the determining, by a first storage system, replication information includes:

sending, by the first storage device, a replication task start message to the second storage device, where the replication task start message carries an identifier of the first source data volume and an identifier of the destination data volume;

determining, by the second storage device, the second source data volume in the second storage device according to the identifier of the first source data volume, the identifier of the destination data volume, and a preset replication relationship, where the replication relationship includes a correspondence among the first source data volume, the second source data volume, and the destination data volume;

determining, by the second storage device, the replication information according to the data stored in the determined second source data volume; and determining, by the first storage device, the replication information according to the data stored in the first source data volume.

With reference to the first possible implementation manner of the first aspect, in a third possible implementation manner, the determining, by a first storage system, replication information includes:

determining, by the first storage device in the first storage system, the replication information according to the data stored in the first source data volume;

sending, by the first storage device, a replication task start message to the second storage device, where the replication task start message carries an identifier of the first source data volume, an identifier of the destination data volume, and the replication information; and determining, by the second storage device according to the identifier of the first source data volume, the identifier of the destination data volume, and a preset replication relationship, the second source data volume corresponding to the replication information, where the replication relationship includes a correspondence among the first source data volume, the destination data volume, and the second source data volume.

With reference to the first aspect or any one of the first to third possible implementation manners of the first aspect, in a fourth possible implementation manner, the determining, by the first storage system, first replication sub-information and second replication sub-information according to the replication information includes: determining, by the first storage device, the first replication sub-information according to the replication information and a preset replication policy; and determining, by the second storage device, the second replication sub-information according to the replication information and the replication policy.

With reference to the first aspect or any one of the first to third possible implementation manners of the first aspect, in a fifth possible implementation manner, the determining, by the first storage system, first replication sub-information and second replication sub-information according to the replication information includes: receiving, by the first storage device, a replication negotiation request of the second storage device, where the replication negotiation request includes at least bandwidth information of a link between the second storage device and the second storage system; determining, by the first storage device, the first replication sub-information and the second replication sub-information according to the bandwidth information of the link; and sending, by the first storage device, the second replication sub-information to the second storage device.

With reference to the first aspect or any one of the first to fifth possible implementation manners of the first aspect, in a sixth possible implementation manner, the replication information consists of the first replication sub-information and the second replication sub-information, and the method further includes: in a process of executing the current replication task, generating, by the first storage device, first replication progress information according to data that has been replicated; sending, by the first storage device, the first replication progress information to the second storage device; when the first storage device is faulty, determining, by the second storage device according to the first replication progress information, the second replication sub-information, and the replication information, data that has not been replicated by the first storage device; and replicating, by the second storage device to the second storage system, the data that has not been replicated by the first storage device.

According to a second aspect, an embodiment of the present disclosure provides a data replication method, where the method is applied to a storage system and includes:

receiving, by a second storage system, replication information sent by a first storage system, where the replication information is used to indicate data that needs to be replicated by the first storage system to the second storage system in a current replication task, the first storage system includes at least a first storage device and a second storage device, the first storage device and the second storage device store same data, and the first storage system and the second storage system implement data backup by using an asynchronous replication technology;

sending, by the second storage system, a first acquisition request to the first storage device according to the replication information, where the first acquisition request includes information about data that needs to be acquired by the second storage system from the first storage device in the current replication task;

sending, by the second storage system, a second acquisition request to the second storage device according to the replication information, where the second acquisition request includes information about data that needs to be acquired by the second storage system from the second storage device in the current replication task, and the data requested by using the first acquisition request is different from the data requested by using the second acquisition request;

receiving, by the second storage system, data that is sent by the first storage device according to the first acquisition request; and receiving, by the second storage system, data that is sent by the second storage device according to the second acquisition request.

In a first possible implementation manner of the second aspect, the information, which is included in the first acquisition request, about the requested data includes at least an identifier of a first source data volume in the first storage device and an address of the data requested by using the first acquisition request; and the information, which is included in the second acquisition request, about the requested data includes at least an identifier of a second source data volume in the second storage device and an address of the data requested by using the second acquisition request, where both the first source data volume and the second source data volume store the data that needs to be replicated by the first storage system to the second storage system in the current replication task, and data stored in the first source data volume is the same as data stored in the second source data volume.

With reference to the first possible implementation manner of the second aspect, in a second possible implementation manner of the second aspect, the receiving, by a second storage system, replication information sent by a first storage system includes:

receiving, by the second storage system, a replication task start message sent by the first storage system, where the replication task start message carries the identifier of the first source data volume and the replication information that is determined according to the data stored in the first source data volume; and the method further includes: determining, by the second storage system, the second source data volume in the second storage device and a destination data volume in the second storage system according to the identifier of the first source data volume and a preset replication relationship, where the replication relationship includes a correspondence among the first source data volume, the second source data volume, and the destination data volume, and the destination data volume is configured to store the data received by the second storage system in the current replication task.

With reference to the second aspect or the first or second possible implementation manner of the second aspect, in a third possible implementation manner, the sending, by the second storage system, a first acquisition request to the first storage device according to the replication information includes:

determining, by the second storage system according to the replication information and bandwidth of a link between the second storage system and the first storage device, the data that needs to be acquired from the first storage device; and sending, by the second storage system, the first acquisition request to the first storage device according to the determined data that needs to be acquired from the first storage device; and the sending, by the second storage system, a second acquisition request to the second storage device according to the replication information includes:

determining, by the second storage system according to the replication information and bandwidth of a link between the second storage system and the second storage device, the data that needs to be acquired from the second storage device; and sending, by the second storage system, the second acquisition request to the second storage device according to the determined data that needs to be acquired from the second storage device.

According to a third aspect, an embodiment of the present disclosure provides a storage system, where the storage system includes at least a first storage device and a second storage device, and the first storage device and the second storage device store same data, where the storage system is configured to determine replication information, where the replication information is used to indicate data that needs to be replicated by the storage system to another storage system in a current replication task, and the storage system and the another storage system implement data backup by using an asynchronous replication technology;

the storage system is further configured to determine first replication sub-information and a second replication sub-information according to the replication information, where the first replication sub-information is used to indicate data that needs to be replicated by the first storage device to the another storage system in the current replication task, the second replication sub-information is used to indicate data that needs to be replicated by the second storage device to the another storage system in the current replication task, and the data indicated by the first replication sub-information is different from the data indicated by the second replication sub-information;

the first storage device is configured to replicate, to the another storage system according to the first replication sub-information, the data that needs to be replicated by the first storage device to the another storage system; and the second storage device is configured to replicate, to the another storage system according to the second replication sub-information, the data that needs to be replicated by the second storage device to the another storage system.

In a first possible implementation manner of the third aspect, the first storage device is configured to replicate, to a destination data volume in the another storage system according to the first replication sub-information, the data that needs to be replicated by the first storage device to the another storage system and that is stored in a first source data volume; and the second storage device is configured to replicate, to the destination data volume in the another storage system according to the second replication sub-information, the data that needs to be replicated by the second storage device to the another storage system and that is stored in a second source data volume, where data stored in the first source data volume is the same as data stored in the second source data volume.

With reference to the first possible implementation manner of the third aspect, in a second possible implementation manner of the third aspect, the first storage device is further configured to send a replication task start message to the second storage device, where the replication task start message carries an identifier of the first source data volume and an identifier of the destination data volume;

the second storage device is further configured to: determine the second source data volume in the second storage device according to the identifier of the first source data volume, the identifier of the destination data volume, and a preset replication relationship, and determine the replication information according to the data stored in the determined second source data volume, where the replication relationship includes a correspondence among the first source data volume, the destination data volume, and the second source data volume; and the first storage device is further configured to determine the replication information according to the data stored in the first source data volume.

With reference to the first possible implementation manner of the third aspect, in a third possible implementation manner of the third aspect, the first storage device is further configured to: determine the replication information according to the data stored in the first source data volume, and send a replication task start message to the second storage device, where the replication task start message carries an identifier of the first source data volume, an identifier of the destination data volume, and the replication information; and the second storage device is further configured to determine, according to the identifier of the first source data volume, the identifier of the destination data volume, and a preset replication relationship, the second source data volume corresponding to the replication information, where the replication relationship includes a correspondence among the first source data volume, the destination data volume, and the second source data volume.

With reference to the third aspect or any one of the first to third possible implementation manners of the third aspect, in a fourth possible implementation manner of the third aspect, the first storage device is further configured to determine the first replication sub-information according to the replication information and a preset replication policy; and the second storage device is further configured to determine the second replication sub-information according to the replication information and the replication policy.

With reference to the third aspect or any one of the first to third possible implementation manners of the third aspect, in a fifth possible implementation manner of the third aspect, the first storage device is further configured to: receive a replication negotiation request of the second storage device, where the replication negotiation request includes at least bandwidth information of a link between the second storage device and the another storage system; determine the first replication sub-information and the second replication sub-information according to the bandwidth information of the link; and send the second replication sub-information to the second storage device.

With reference to the third aspect or any one of the first to fifth possible implementation manners of the third aspect, in a sixth possible implementation manner of the third aspect, the replication information consists of the first replication sub-information and the second replication sub-information; the first storage device is further configured to: in a process of executing the current replication task, generate first replication progress information according to data that has been replicated, and send the first replication progress information to the second storage device; and the second storage device is further configured to: when the first storage device is faulty, determine, according to the first replication progress information, the second replication sub-information, and the replication information, data that has not been replicated by the first storage device, and replicate, to the another storage system, the data that has not been replicated by the first storage device.

According to a fourth aspect, an embodiment of the present disclosure provides a storage system, including:

a receiving module, configured to receive replication information sent by another storage system, where the replication information is used to indicate data that needs to be replicated by the another storage system to the storage system in a current replication task, the another storage system includes at least a first storage device and a second storage device, the first storage device and the second storage device store same data, and the storage system and the another storage system implement data backup by using an asynchronous replication technology; and a sending module, configured to send a first acquisition request to the first storage device according to the replication information, where the first acquisition request includes information about data that needs to be acquired by the storage system from the first storage device in the current replication task, where the sending module is further configured to send a second acquisition request to the second storage device according to the replication information, where the second acquisition request includes information about data that needs to be acquired by the storage system from the second storage device in the current replication task, and the data requested by using the first acquisition request is different from the data requested by using the second acquisition request; and the receiving module is further configured to receive data that is sent by the first storage device according to the first acquisition request, and receive data that is sent by the second storage device according to the second acquisition request.

In a first possible implementation manner of the fourth aspect, the information, which is included in the first acquisition request, about the requested data includes at least an identifier of a first source data volume in the first storage device and an address of the data requested by using the first acquisition request; and the information, which is included in the second acquisition request, about the requested data includes at least an identifier of a second source data volume in the second storage device and an address of the data requested by using the second acquisition request, where both the first source data volume and the second source data volume store the data that needs to be replicated by the another storage system to the storage system in the current replication task, and data stored in the first source data volume is the same as data stored in the second source data volume.

With reference to the first possible implementation manner of the fourth aspect, in a second possible implementation manner of the fourth aspect, the receiving module is further configured to receive a replication task start message sent by the another storage system, where the replication task start message carries the identifier of the first source data volume and the replication information that is determined according to the data stored in the first source data volume; and the storage system further includes: a message processing module, configured to determine the second source data volume in the second storage device and a destination data volume in the storage system according to the identifier of the first source data volume and a preset replication relationship, where the replication relationship includes a correspondence among the first source data volume, the second source data volume, and the destination data volume, and the destination data volume is configured to store the data received by the storage system in the current replication task.

With reference to the fourth aspect or either of the first and second possible implementation manners of the fourth aspect, in a third possible implementation manner of the fourth aspect, the storage system further includes:

a determining module, configured to: determine, according to the replication information and bandwidth of a link between the storage system and the first storage device, the data that needs to be acquired from the first storage device, and determine, according to the replication information and bandwidth of a link between the storage system and the second storage device, the data that needs to be acquired from the second storage device, where the sending module is specifically configured to send the first acquisition request to the first storage device according to the data that is determined by the determining module and that needs to be acquired from the first storage device, and send the second acquisition request to the second storage device according to the data that is determined by the determining module and that needs to be acquired from the second storage device.

According to a fifth aspect, an embodiment of the present disclosure provides still another storage system, including a controller and a storage, where the storage is configured to store data sent by another storage system; and the controller includes:

a communications interface, configured to communicate with the another storage system;

a memory, configured to store a computer executable instruction; and a processor, configured to run the computer executable instruction, to perform the method according to the foregoing second aspect.

According to a sixth aspect, an embodiment of the present disclosure provides a computer program product, including a computer readable storage medium that stores program code, where an instruction included in the program code is used to perform the method according to the foregoing first aspect.

According to a seventh aspect, an embodiment of the present disclosure provides a computer program product, including a computer readable storage medium that stores program code, where an instruction included in the program code is used to perform the method according to the foregoing second aspect.

In the data replication method provided by the embodiments of the present disclosure, because a first storage device and a second storage device that are in a first storage system store same data, in a process of replication from the first storage system to a second storage system, the first storage system may determine first replication sub-information and second replication sub-information according to replication information in a current replication task, the first storage device replicates data to the second storage system according to the first replication sub-information, and the second storage device replicates data to the second storage system according to the second replication sub-information. According to the method provided by the embodiments of the present disclosure, one replication task of the first storage system can be shared by the first storage device and the second storage device, so that efficiency of replication performed between the first storage system and the second storage system can be improved without increasing production costs.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure.

DESCRIPTION OF EMBODIMENTS

To make a person skilled in the art understand the solutions in the present disclosure better, the following clearly describes the technical solutions in the embodiments of the present disclosure with reference to the accompanying drawings in the embodiments of the present disclosure. Apparently, the described embodiments are merely some but not all of the embodiments of the present disclosure.

Figure 1:
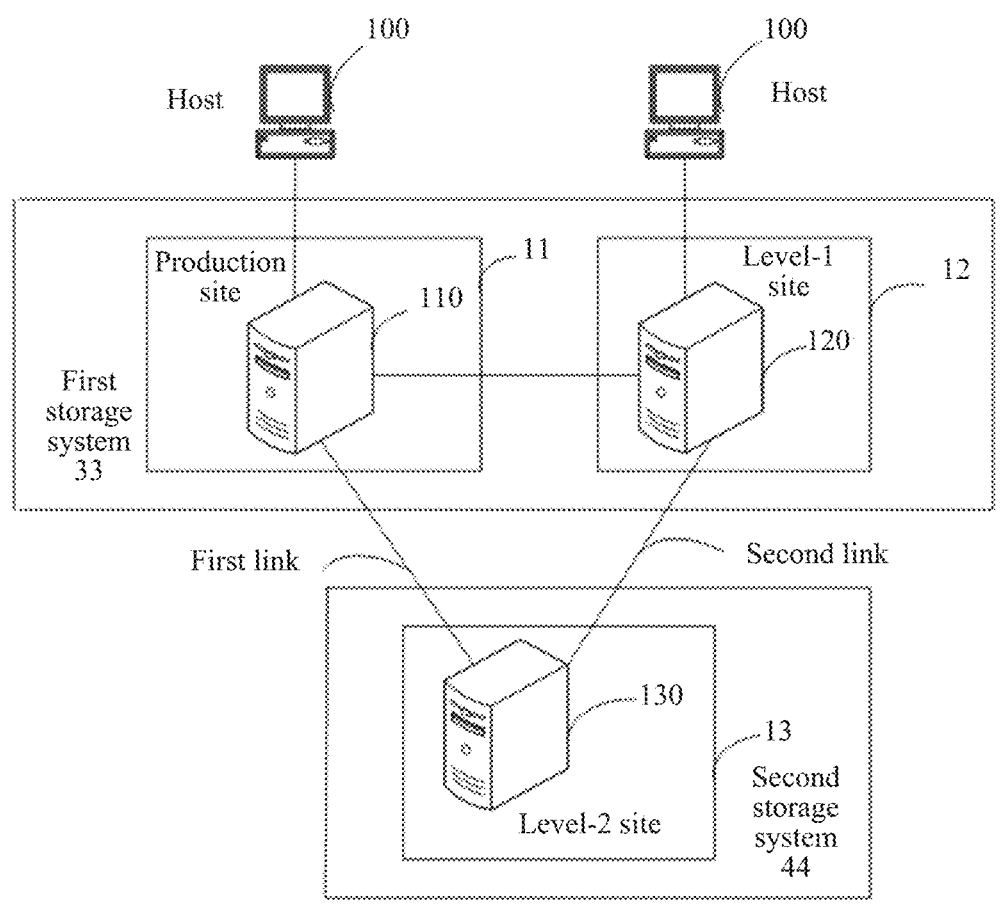
FIG. 1 is a schematic diagram of an application scenario according to an embodiment of the present disclosure.

A data replication method provided by the embodiments of the present disclosure is mainly applied to a disaster recovery system with multiple data centers. The disaster recovery system with multiple data centers that is described in the embodiments of the present disclosure refers to a disaster recovery system including three or more data centers. For ease of description, the embodiments of the present disclosure are described by using a 3 data center (3DC) disaster recovery system as an example. FIG. 1 is a schematic diagram of an application scenario according to an embodiment of the present disclosure. A 3DC disaster recovery system shown in FIG. 1 includes at least one host 100 and three data centers. The three data centers include at least one production site and two disaster recovery sites. For ease of description, in this embodiment of the present disclosure, the three data centers shown in FIG. 1 are respectively referred to as a production site 11, a level-1 site 12, and a level-2 site 13, where the level-1 site 12 and the level-2 site 13 are generally the disaster recovery sites. The three data centers may be connected to each other by using a fiber or a network cable in a star-shaped networking manner. The three data centers may perform data transmission with each other by using the IP (Internet Protocol) protocol or an FC (Fiber Channel) protocol. In this embodiment of the present disclosure, the host 100 may communicate with the production site 11 or the level-1 site 12 based on the Small Computer System Interface (SCSI) Protocol or based on the Internet Small Computer System Interface (iSCSI) Protocol, which is not limited herein.

The production site 11 includes a first storage device 110, the level-1 site 12 includes a second storage device 120, and the level-2 site 13 includes a third storage device 130. The first storage device 110, the second storage device 120, and the third storage device 130 may be storage devices such as a storage array or a server known in current technologies. For example, the first storage device 110, the second storage device 120, and the third storage device 130 may include a storage area network (SAN) array, or may include a network attached storage (NAS) array. A specific form of a storage device in each data center is not limited in this embodiment of the present disclosure. It should be noted that all methods in the embodiments of the present disclosure are performed by the storage devices in these sites. For ease of description, in this embodiment of the present disclosure, if not otherwise stated, the production site 11 refers to the first storage device 110 in the production site 11, the level-1 site 12 refers to the second storage device 120 in the level-1 site 12, and the level-2 site 13 refers to the third storage device 130 in the level-2 site 13.

In the application scenario shown in FIG. 1, a distance between the production site 11 and the level-1 site 12 is relatively short. Generally, the distance between the production site 11 and the level-1 site 12 may be less than 100 km. For example, the production site 11 and the level-1 site 12 may be located in two different locations in a same city. A distance between the level-2 site 13 and the production site 11 or the level-1 site 12 is relatively long. Generally, the distance between the level-2 site 13 and the production site 11 may be at least 1000 km. For example, the level-2 site 13 and the production site 11 may be located in different cities. Certainly, in this embodiment of the present disclosure, the production site 11 and the level-1 site 12 are not necessarily limited to be in a same city, as long as synchronous replication of data between the production site 11 and the level-1 site 12 can be implemented.

The host 100 may include any computing device known in current technologies, such as a server, a desktop computer, or an application server. An operating system and another application program are installed in the host 100. There may be multiple hosts 100.

In the application scenario shown in FIG. 1, the level-2 site 13 is mainly used as a disaster recovery site, and is configured to back up data. The host 100 does not access the level-2 site 13. Both the production site 11 and the level-1 site 12 may receive an access request from the host 100. In a situation, the host 100 may write data only to the production site 11. For example, one or more hosts 100 may perform a data write operation on the production site 11. In another situation, one host 100 may also write different data separately to the production site 11 and the level-1 site 12. In still another situation, different hosts 100 may perform a data write operation on the production site 11 and the level-1 site 12 respectively. For example, a host A performs a data write operation on the production site 11, and a host B also performs a data write operation on the level-1 site 12. It is understandable that, in the latter two situations, because the production site 11 and the level-1 site 12 may simultaneously undertake a service of the host 100, efficiency for reading and writing data can be improved. In this embodiment of the present disclosure, whether the production site 11 and the level-1 site 12 simultaneously undertake the service of the host 100 is not limited, as long as synchronous replication can be implemented between the production site 11 and the level-1 site 12 and real-time synchronization of data in the production site 11 and the level-1 site 12 can be ensured. It should be noted that, because in the disaster recovery system shown in FIG. 1, both the production site 11 and the level-1 site 12 may receive an access request from the host 100, and the production site 11 and the level-1 site 12 keep consistency of stored data in a synchronous replication manner, roles of the production site 11 and the level-1 site 12 are interchangeable.

In this embodiment of the present disclosure, the production site 11 and the level-1 site 12 may keep, by using a synchronous replication technology, data stored in the production site 11 and data stored in the level-1 site 12 synchronized in real time. For example, when the host 100 writes data to the production site 11, the production site 11 may simultaneously back up the data to the level-1 site 12. After the data is written to both the production site 11 and the level-1 site 12, the production site 11 returns a write success response to the host 100, so as to keep the data in the production site 11 and the data in the level-1 site 12 synchronized. Because the distance between the level-2 site 13 and the production site 11 is relatively long, the production site 11 or the level-1 site 12 may store the data in the level-2 site 13 by using an asynchronous replication technology. For example, when the host 100 writes data to the production site 11, the production site 11 may directly return a write success response to the host 100. After a period of time, the production site 11 sends, to the level-2 site 13 for storage, the data written by the host 100, so as to implement further backup on the data. It should be noted that, in this embodiment of the present disclosure, the writing data to the production site 11 may be writing the data to a cache of the production site 11, or may refer to writing the data to a storage of the production site 11, which is not limited herein.

It should be noted that, a storage space formed by the storage of the production site 11 may include multiple data volumes. The data volume in this embodiment of the present disclosure is a logical storage space formed by mapping a physical storage space. For example, the data volume may be a logic unit identified by a logical unit number (LUN), or may be a file system. It is understandable that, a storage space of the level-1 site 12 or a storage space of the level-2 site 13 may also include multiple data volumes.

In an actual application, in the 3DC disaster recovery system, data is generally kept synchronized between the production site 11 and the level-1 site 12 by using the synchronous replication technology, and asynchronous replication is established between the production site 11 and the level-2 site 13 or asynchronous replication is established between the level-1 site 12 and the level-2 site 13. For example, in an asynchronous replication process, asynchronous replication is performed by using a link between the production site 11 and the level-2 site 13, and a link between the level-1 site 12 and the level-2 site 13 is used as a backup link. For ease of description, in this embodiment of the present disclosure, the link between the production site 11 and the level-2 site 13 is referred to as a first link, and the link between the level-1 site 12 and the level-2 site 13 is referred to as a second link. When an exception occurs in a process of replication between the production site 11 and the level-2 site 13, data may be re-replicated from the level-1 site 12 to the level-2 site 13. That the exception occurs in the replication process includes: an exception occurs in the replication process because a fault occurs on the production site 11, or an exception occurs in the replication process because a fault occurs on the first link. It is understandable that, in the asynchronous replication process, asynchronous replication may also be performed by using the link between the level-1 site 12 and the level-2 site 13, and the link between the production site 11 and the level-2 site 13 is used as a backup link.

However, because the data in the production site 11 changes greatly, in the asynchronous replication process, if asynchronous replication is performed by using only the first link, bandwidth of the first link may become a bottleneck of a data backup process. In an actual application, if a first link with greater bandwidth is used to perform backup, costs of a user may increase. To improve bandwidth for data backup without increasing costs, in this embodiment of the present disclosure, when asynchronous replication needs to be performed, the production site 11 and the level-1 site 12 simultaneously perform asynchronous replication to the level-2 site 13. In this manner, in the asynchronous replication process, both the first link and the second link are in an active state.

Because this embodiment of the present disclosure mainly involves how to replicate data from the production site 11 and the level-1 site 12 to the level-2 site 13, for ease of description, in the following embodiments, a storage system including the first storage device 110 and the second storage device 120 that send data in a replication process is referred to as a first storage system 33, and a storage system to which the third storage device 130 that receives data belongs is referred to as a second storage system 44. It is understandable that the first storage system 33 may further include another storage device, and the second storage system 44 may also further include another storage device.

Figure 2:
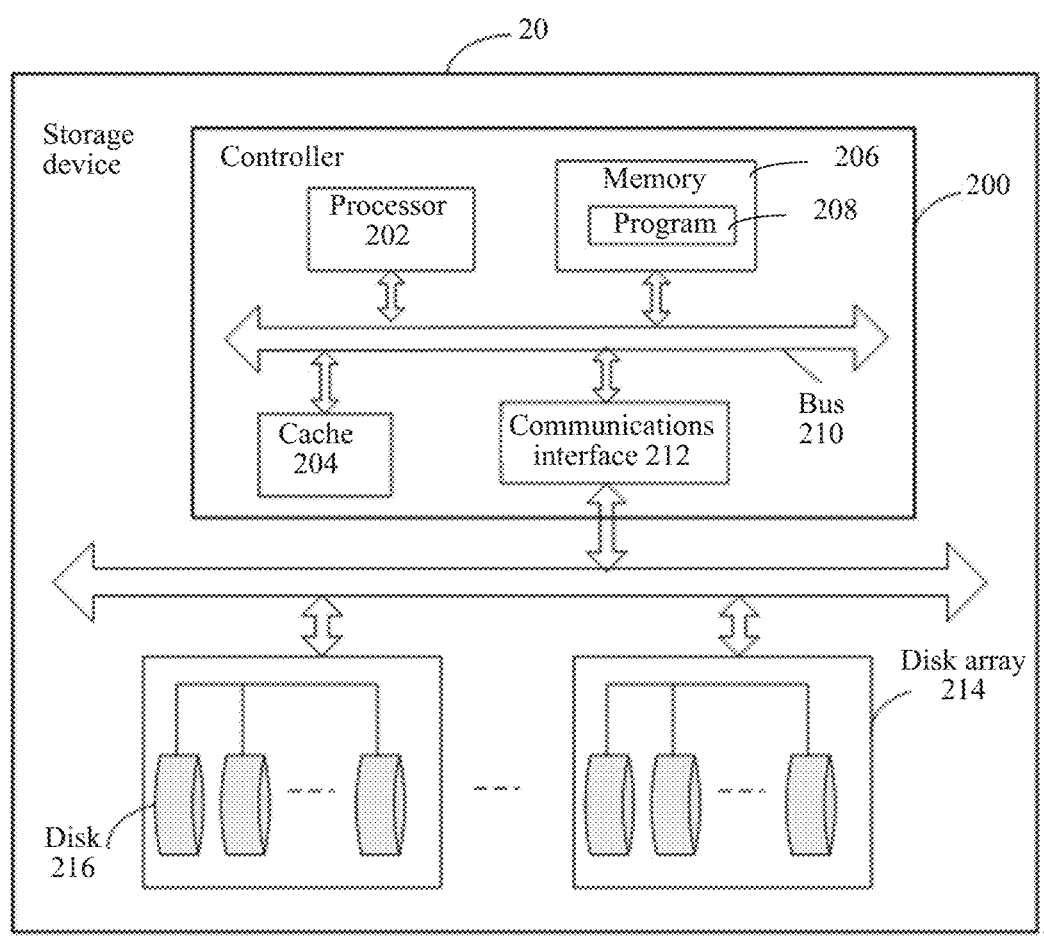
FIG. 2 is a schematic structural diagram of a storage device according to an embodiment of the present disclosure.

A structure of the first storage device 110, the second storage device 120, and the third storage device 130 shown in FIG. 1 may be shown in FIG. 2. FIG. 2 is a schematic structural diagram of a storage device 20 according to an embodiment of the present disclosure. The storage device 20 shown in FIG. 2 is a storage array. As shown in FIG. 2, the storage device 20 may include a controller 200 and a disk array 214, where the disk array 214 herein is configured to provide a storage space, and may include a redundant array of independent disks (RAID) or a disk chassis including multiple disks. There may be multiple disk arrays 214, and the disk array 214 includes multiple disks 216. The disk 216 is configured to store data. The disk array 214 is in communication connection with the controller 200 by using a communication protocol, for example, the SCSI Protocol, which is not limited herein.

It is understandable that the disk array 214 is merely an example of a storage in the storage system. In this embodiment of the present disclosure, data may also be stored by using a storage, for example, a tape library. It should be noted that the disk 216 is also merely an example of a memory for building the disk array 214. In an actual application, there may further be an implementation manner, for example, for building a disk array between cabinets including multiple disks. Therefore, in this embodiment of the present disclosure, the disk array 214 may also include a storage including a non-volatile storage medium such as a solid state disk (SSD), a cabinet including multiple disks, or a server, which is not limited herein.

The controller 200 is a "brain" of the storage device 20, and mainly includes a processor 202, a cache 204, a memory 206, a communications bus (a bus for short) 210, and a communications interface 212. The processor 202, the cache 204, the memory 206, and the communications interface 212 communicate with each other by using the communications bus 210. It should be noted that, in this embodiment of the present disclosure, there may be one or more controllers 200 in the storage device 20. It is understandable that, when the storage device 20 includes at least two controllers 200, stability of the storage device 20 may be improved.

The communications interface 212 is configured to communicate with the host 100, the disk 216, or another storage device.

The memory 206 is configured to store a program 208. The memory 206 may include a high-speed RAM memory, or may further include a non-volatile memory, for example, at least one magnetic disk storage. It is understandable that the memory 206 may be various non-transitory machine readable media, such as a random access memory (RAM), a magnetic disk, a hard disk drive, an optical disc, a SSD, or a non-volatile memory, that can store program code.

The program 208 may include program code, and the program code includes a computer operation instruction.

The cache 204 is a storage between the controller and the hard disk drive, and has a capacity smaller than that of the hard disk drive but a speed faster than that of the hard disk drive. The cache 204 is configured to temporarily store data received from the host 100 or another storage device and temporarily store data read from the disk 216, so as to improve performance and reliability of the array. The cache 204 may be various non-transitory machine readable media, such as a RAM, a ROM, a flash memory, or a SSD, that can store data, which is not limited herein.

The processor 202 may be a central processing unit CPU or an application-specific integrated circuit ASIC (Application-Specific Integrated Circuit), or is configured as one or more integrated circuits that implement this embodiment of the present disclosure. An operating system and another software program are installed in the processor 202, and different software programs may be considered as different processing module, and have different functions, such as processing an input/output (I/O) request for the disk 216, performing another processing on data in the disk 216, or modifying metadata saved in the storage device 20. Therefore, the controller 200 can implement various data management functions, such as an IO operation, a snapshot, mirroring, and replication. In this embodiment of the present disclosure, the processor 202 is configured to execute the program 208, and specifically, may perform relevant steps in the following method embodiments.

It is understandable that, in this embodiment of the present disclosure, hardware structures of the first storage device 110, the second storage device 120, and the third storage device 130 may be similar. However, because the first storage device 110, the second storage device 120, and the third storage device 130 undertake different functions in a data replication process, a processor 202 in the first storage device 110, a processor 202 in the second storage device 120, and a processor 202 in the third storage device 130 may execute different programs 208. The following describes in detail how the storage devices in this embodiment of the present disclosure specifically implement a data replication method.

Figure 3:
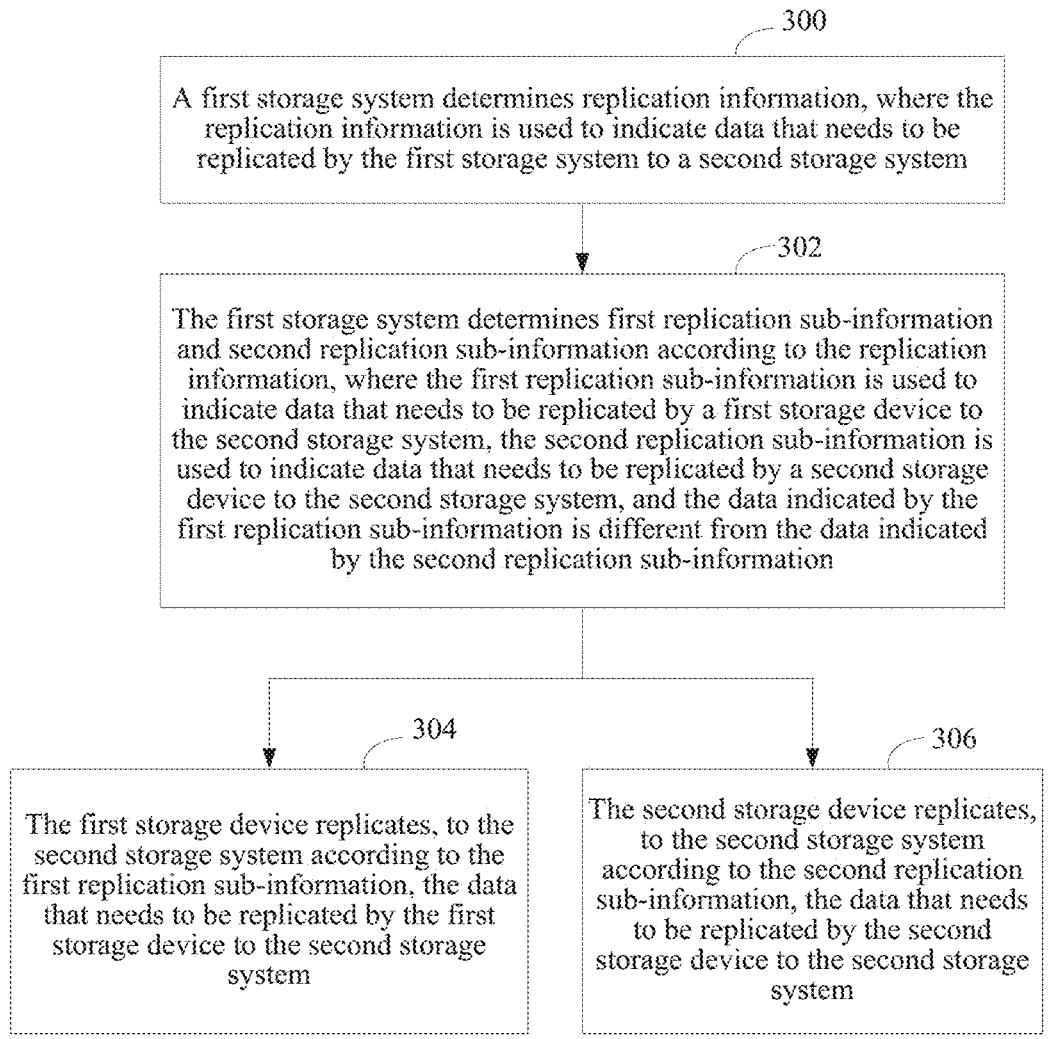
FIG. 3 is a flowchart of a data replication method according to an embodiment of the present disclosure.

FIG. 3 is a flowchart of a data replication method according to an embodiment of the present disclosure. The method may be applied to the application scenario shown in FIG. 1. The method shown in FIG. 3 is described from a perspective of a first storage system 33 that sends data. The first storage system 33 may include the first storage device 110 in the production site 11 and the second storage device 120 in the level-1 site 12 that are shown in FIG. 1. Data stored in the first storage device 110 is the same as data stored in the second storage device 120. A second storage system 44 that receives replicated data may include a third storage device 130. Hardware structures of both the first storage device 110 and the second storage device 120 in this embodiment of the present disclosure may be both shown in FIG. 2. Specifically, the method in FIG. 3 may be jointly performed by a processor 202 in the first storage device 110 and a processor 202 in the second storage device 120. The following describes the data replication method shown in FIG. 3 with reference to FIG. 1 and FIG. 2. As shown in FIG. 3, the method may include the following steps.

In step 300, the first storage system 33 determines replication information according to stored data, where the replication information is used to indicate data that needs to be replicated by the first storage system 33 to the second storage system 44 in a current replication task. The replication task (which may also be referred to as a remote asynchronous replication task) refers to that the first storage system 33 replicates, to a data volume in the second storage system 44, data carried in a write data command that is received by a data volume in the first storage system 33 in a period of time. In an actual application, the first storage system 33 may send all data in the data volume in the period of time to the second storage system 44, or may send differential data (which is also referred to as incremental data) that is relative to a last replication task and that is received in the period of time to the second storage system 44, which is not limited herein.

It should be noted that, in a situation, because the first storage device 110 or the second storage device 120 may have multiple data volumes, there may be multiple replication tasks at the same time. In this embodiment of the present disclosure, replication task identifiers may be used to distinguish different replication tasks, where the replication task identifier may be determined according to an identifier of a source data volume and an identifier of a destination data volume in a current replication process. For example, the replication task identifier may be A LUN001 B LUN002, used to represent that the replication task is to replicate data from a LUN with an identifier of 001 in a storage device A to a LUN with an identifier of 002 in a storage device B. In addition, the replication task identifier may also be represented by another identifier, which is not limited herein, as long as the storage devices can identify the source data volume and the destination data volume that are in the current replication task.

It is understandable that, in this embodiment of the present disclosure, although the first storage device 110 and the second storage device 120 keep consistency of stored data in a synchronous replication manner, identifiers of data volumes, in the first storage device 110 and the second storage device 120, storing same data are not necessarily the same. For example, an ID of a LUN, in the first storage device 110, storing data A may be LUN 1#, and an ID of a LUN, in the second storage device 120, storing the data A may be LUN 2#. In an actual application, a replication relationship among data volumes in the first storage device 110, the second storage device 120, and the third storage device 130 may be pre-configured, so that all of the first storage device 110, the second storage device 120, and the third storage device 130 may determine a corresponding source data volume and destination data volume in the current replication task according to the replication relationship. In other words, data backup may be implemented between data volumes having a replication relationship.

A set replication relationship may include a replication relationship identifier, or may include identifiers of LUNs in the first storage device 110, the second storage device 120, and the third storage device 130. For example, the replication relationship identifier may be: A LUN001 B LUN002 C LUN003, used to represent that there is a replication relationship among a LUN with an identifier of 001 in a storage device A, a LUN with an identifier of 002 in a storage device B. and a LUN with an identifier of 003 in a storage device C. Certainly, the replication relationship identifier may also be represented by another identifier, and no limitation is made herein, as long as the storage devices can identify the replication relationship involved in the current replication task. In an actual application, the replication relationship may be saved in advance in all of the first storage device 110, the second storage device 120, and the third storage device 130.

In this embodiment of the present disclosure, the replication task is a replication task between LUNs in different storage devices that is started according to a preset replication relationship; at a moment, there may be only one replication task for data volumes having a replication relationship. This embodiment of the present disclosure mainly involves a process of an interaction between devices in a replication task. Therefore, in this embodiment of the present disclosure, a replication task may be represented by a replication relationship identifier. In other words, in this embodiment of the present disclosure, the replication task identifier may be the same as the replication relationship identifier. Certainly, in an actual application, to distinguish multiple replication tasks, existing in different time periods, of data volumes having a replication relationship, the replication task identifier may also be different from the replication relationship identifier. For example, a time identifier may be added to the replication relationship identifier, to form the replication task identifier, and is used to represent that the replication task is a replication task, started at a different moment, between data volumes having a replication relationship.

It is understandable that, in a situation, if only one data volume is stored in a storage space of each of the first storage device 110, the second storage device 120, and the third storage device 130, the current replication task is a replication task started at a current moment for a unique data volume in each storage device. Therefore, the replication relationship among the LUNs in the storage devices may also not be preset.

Figures 3A, 3B:
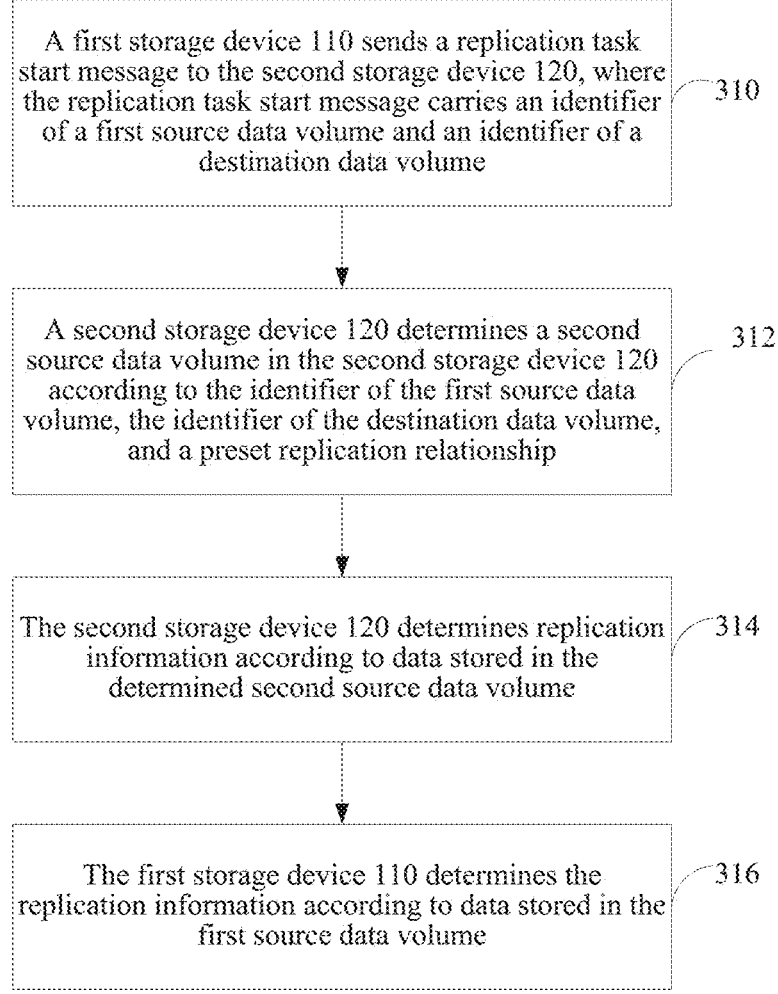
FIG. 3a is a schematic diagram of a replication bitmap according to an embodiment of the present disclosure.
FIG. 3b is a flowchart of a replication information determining method according to an embodiment of the present disclosure.

In this embodiment of the present disclosure, the replication information may be determined according to differential data information received by the first storage device 110 or the second storage device 120. The differential data information refers to information about data written to a storage device after a previous replication task of the current replication task begins and before the current replication task begins. In an actual application, the differential data information may be recorded by using a differential bitmap. The first storage device 110 is used as an example, and the first storage device 110 may create a differential bitmap for each data volume (for example, a LUN), for recording information about data written to the data volume. FIG. 3a shows an example of a differential bitmap according to an embodiment of the present disclosure. As shown in FIG. 3a, each grid in the differential bitmap corresponds to an address in the LUN. In this embodiment of the present disclosure, a flag bit "1" is used to represent that a data write occurs. Because a write data command sent by a host 100 may carry data needing to be written and an address of the data, after receiving the write data command sent by the host 100, the first storage device 110 may set a flag bit in a corresponding grid in the differential bitmap to "1" according to the address of the data carried in the write data command. Information about changed data written to the LUN can be recorded in the manner of performing recording by using a differential bitmap. It is understandable that, in same replication duration, if data of a same address is changed continuously, when recording is performed, a flag bit in a grid corresponding to the address of the data may always be set to "1". It is understandable that, in another situation, a flag bit "0" may also be used to represent that a data write occurs. In still another situation, alternatively, "1" may be used to represent that a data write occurs, and "0" to represent that no data write occurs. In addition, whether a data write occurs may also be represented by using another flag bit, and a specific form of the flag bit is not limited herein. In this embodiment of the present disclosure, the differential bitmap may be saved in a cache of the first storage device 110 or the second storage device 120, or may be saved in a storage of the first storage device 110 or the second storage device 120.

It is understandable that, in addition to being recorded in a form of the differential bitmap, the differential data information may further be recorded in a tree structure. For example, the differential data information may be recorded by using a differential binary tree, a differential B+ tree, or another tree. When the differential data information is recorded by using the tree structure, each leaf node may correspond to an address in a LUN. When a data write occurs, a flag bit of the leaf node is set to a corresponding identifier, for representing that a data write occurs for an address corresponding to the leaf node. In still another situation, the differential data information may also be recorded in a structure of a linked list or an entry. When the differential data information is represented in a form of a linked list, each entry in the list corresponds to an address in a LUN. In addition, the differential data information may further be recorded in a form of a log and the like, which is not limited herein. Similar to the differential bitmap, the foregoing differential data information recorded in the form of the tree structure, the linked list, the log, and the like may be saved in the cache of the first storage device 110 or the second storage device 120, or may be saved in the storage of the first storage device 110 or the second storage device 120.

It is understandable that, when the differential data information is recorded in the form of the differential bitmap, the replication information may also be represented in a form of a replication bitmap. When the differential data information is recorded in a form of a differential tree, the replication information may also be represented in a form of a replication tree, and so on, and details are not described herein again.

In this embodiment of the present disclosure, for ease of description, a description is provided below by using a differential bitmap as an example, and a flag bit "1" is used to represent that a data write occurs. When a replication task is started, in a situation, the first storage device 110 may convert a differential bitmap when the replication task is started into a replication bitmap, to determine the replication information, and re-generate an empty differential bitmap to record data that is written to the LUN in the first storage device 110 after the current replication task is started. The replication bitmap is used to represent data that needs to be replicated to the third storage device 130 in the current replication task. In this manner, during replication, data of an address corresponding to a grid "1" in the replication bitmap may be replicated to the third storage device 130. In another situation, a differential bitmap and a replication bitmap may be set in the first storage device 110, and the differential bitmap is used to record information about data written to the first storage device after a previous replication task of the current replication task begins and before the current replication task begins. When the current replication task is started, the differential bitmap may be converted into a replication bitmap in the current replication task, and a replication bitmap that is used up in the previous replication task is converted into a new differential bitmap to record information about data written after the current replication task begins. It should be noted that, when the replication bitmap that is used up in the previous replication task is converted into the new differential bitmap, flag bits in the replication bitmap in the previous replication task need to be cleaned, and then a cleaned replication bitmap is used as the new differential bitmap. In other words, in this situation, the differential bitmap and the replication bitmap may be used alternately, and are respectively used to record the differential data information and information about the data to be replicated to the third storage device 130. A manner for specifically determining the replication information according to the differential data information is not limited herein.

As described above, in the 3DC disaster recovery system shown in FIG. 1, because the first storage device 110 and the second storage device 120 that are in the first storage system 33 keep consistency of stored data by using a synchronous replication technology, when it is determined that a replication task between the first storage system 33 and the second storage system 44 needs to be started, and in other words, when it is determined that asynchronous replication to the third storage device 130 needs to be started, the first storage system 33 needs to determine the replication information, for indicating the data that needs to be replicated by the first storage system 33 to the second storage system 44 in the current replication task. In a situation, that the first storage system 33 determines the replication information may be specifically: the first storage device 110 and the second storage device 120 may separately determine the replication information according to the stored data. Because the data stored in the first storage device 110 is the same as the data stored in the second storage device 120, the replication information determined by the first storage device 110 according to the stored data is the same as the replication information determined by the second storage device 120 according to the stored data. Specifically, in this embodiment of the present disclosure, a description is provided by using an example in which the current replication task is a replication task started among a first source data volume in the first storage device 110, a second source data volume in the second storage device 120, and a destination data volume in the third storage device 130. Data stored in the first source data volume is the same as data stored in the second source data volume. FIG. 3b is a flowchart of a replication information determining method according to an embodiment of the present disclosure. As shown in FIG. 3b, the method may include the following steps.

In step 310, the first storage device 110 sends a replication task start message to the second storage device 120. The replication task start message carries an identifier of the first source data volume in the first storage device 110 and an identifier of the destination data volume in the third storage device 130. The replication task start message is used to notify the second storage device 120 that the current replication task is a replication task between the first source data volume in the first storage device 110 and the destination data volume in the third storage device 130.

The replication task start message may be in a pre-defined message format. For example, a header of the replication task start message may include a message type (for example, opCode) field, a source device ID (for example, srcAppId) field, and a destination device ID (for example, dstAppId) field. The message type field is used to represent that a type of the message is a replication task start message. The source device ID field is used to identify an initiator of the replication task start message, and the destination device ID field is used to identify a receiver of the replication task start message. Both the source device ID field and the destination device ID field may be identified by using an IP address. A format of a content part (for example, a data field of the replication task start message) of the replication task start message may be shown as follows:

| Byte | 0 | 1 | 2 | 3 |
|---|---|---|---|---|
| 0 | LUN ID | | | |
| 4 | ReplicationObject LUN id | | | | where LUN ID may be located in the zeroth to the third bytes, and is used to represent an identifier of a source data volume in the current replication task, where the LUN identifier is a unique identifier; and ReplicationObject LUN id may be located in the seventh to the eighth bytes, is used to represent an identifier of a destination data volume in a destination device that receives data in the current replication task, and may be, for example, a LUN ID of the destination device; in other words, the field is used to represent a destination data volume in a destination storage device to which the current replication task points to.

For example, in this step, in the replication task start message sent by the first storage device 110 to the third storage device 130, the "LUN ID" field may be an ID, for example, LUN001, of the first source data volume, in the first storage device 110, storing to-be-replicated data, and the "ReplicationObject LUN id" field may be an ID, for example, LUN003, of the destination data volume in the third storage device 130, so as to indicate that the current replication task is a replication task between a LUN with an identifier of 001 in the first storage device 110 and a LUN with an identifier of 003 in the third storage device 130. In still another situation, the "LUN ID" field may also be an ID of the second source data volume in the second storage device 120. In this case, the first storage device 110 may determine an identifier of the second source data volume in advance according to a preset replication relationship, the identifier of the first source data volume, and the identifier of the destination data volume.

In step 312, the second storage device 120 determines the second source data volume in the second storage device according to the identifier of the first source data volume, the identifier of the destination data volume, and a preset replication relationship. The replication relationship includes a correspondence among the first source data volume, the second source data volume, and the destination data volume. As described above, in this embodiment of the present disclosure, the replication relationship among the data volumes is preset in each of the first storage device 110, the second storage device 120, and the third storage device 130. After the second storage device 120 receives the replication task start message of the first storage device 110, the second storage device 120 may determine the second source data volume in the second storage device 120 according to the preset replication relationship, and the identifier of the first source data volume and the identifier of the destination data volume that are carried in the replication task start message.

In step 314, the second storage device 120 determines the replication information according to the data stored in the determined second source data volume. In step 316, the first storage device 110 determines the replication information according to the data stored in the first source data volume. For example, the second storage device 120 may generate a replication bitmap according to a differential bitmap of the second source data volume, and the first storage device 110 may generate a replication bitmap according to a differential bitmap of the first source data volume. For how the first storage device 110 and the second storage device 120 specifically determine the replication information according to the data stored in the data volumes, reference may be made to the foregoing description, and details are not described herein again. Because the data stored in the second source data volume is the same as the data stored in the first source data volume, the replication information determined by the second storage device 120 according to the second source data volume is the same as the replication information determined by the first storage device 110 according to the first source data volume, and the replication information is the replication information determined by the first storage system 33 in the current replication task, and is used to indicate the data that needs to be replicated by the first storage system 33 to the second storage system 44 in the current replication task.

Figure 3C:
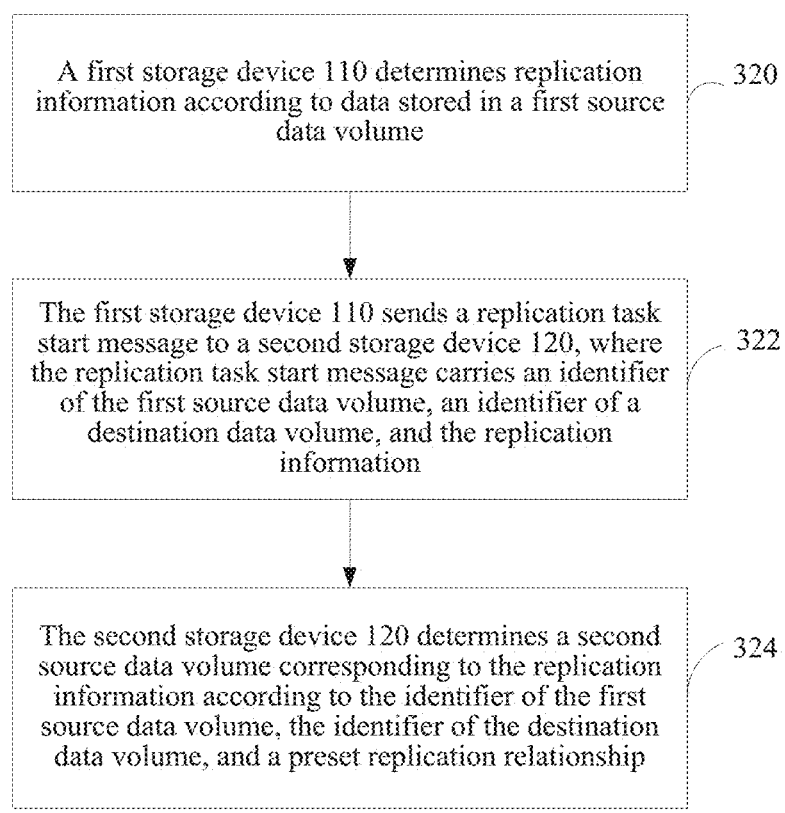
FIG. 3c is a flowchart of another replication information determining method according to an embodiment of the present disclosure.

In another situation, that the first storage system 33 determines the replication information may also be specifically: the first storage device 110 in the first storage system 33 determines the replication information according to the data stored in the first storage device 110, and then sends the determined replication information to the second storage device 120. In this manner, the first storage device 110 and the second storage device 120 each can have the same replication information. Specifically, as shown in FIG. 3c, FIG. 3c is a flowchart of still another replication information determining method according to an embodiment of the present disclosure. The replication information determining method shown in FIG. 3c is described still by using an example in which the current replication task is a replication task started among the first source data volume in the first storage device 110, the second source data volume in the second storage device 120, and the destination data volume in the third storage device 130. Data stored in the first source data volume is the same as data stored in the second source data volume. The method may include the following steps.

In step 320, the first storage device 110 determines the replication information according to the data stored in the first source data volume. Specifically, when the replication task needs to be started, the first storage device 110 may determine the replication information according to a differential bitmap of the first source data volume, where the replication information is used to indicate the data, which needs to be replicated to the second storage system 44, in the current replication task. For a specific manner in which the first storage device 110 determines the replication information, reference may be made to the foregoing description, and details are not described herein again.

In step 322, the first storage device 110 sends a replication task start message to the second storage device 120. The replication task start message may carry an identifier of the first source data volume, an identifier of the destination data volume, and the replication information. The replication task start message is used to notify the second storage device 120 that the current replication task is a replication task between the first source data volume in the first storage device 110 and the destination data volume in the third storage device 130. Because the first storage device 110 already determines the replication information in the current replication task according to the first source data volume in step 320, the first storage device 110 may send the replication information to the second storage device 120 at the same time when instructing the second storage device 120 to start the replication task. Therefore, the second storage device 120 may not determine the replication information by itself. It is understandable that, in a situation in which the second storage device 120 does not record differential data, the first storage device 110 may also send the replication information in the current replication task to the second storage device 120. It is understandable that, in an actual application, in addition to carrying the replication information, the replication task start message may further carry the identifier of the first source data volume and the identifier of the destination data volume, for indicating that the current replication task is a replication task between the first source data volume and the destination data volume. For a specific description of the replication task start message, reference may be made to the foregoing description, and specifically, the replication information may further be carried in another field of the data part of the foregoing replication task start message. For example, the replication information (for example, address information of the to-be-replicated data) may be carried in a field after the eighth byte, and details are not described herein again.

In step 324, the second storage device 120 determines, according to the identifier of the first source data volume, the identifier of the destination data volume, and a preset replication relationship, the second source data volume corresponding to the replication information. The replication relationship includes a correspondence among the first source data volume, the destination data volume, and the second source data volume. Specifically, after receiving the replication task start message of the first storage device 110, the second storage device 120 may determine, according to the preset replication relationship and the identifier of the first source data volume and the identifier of the destination data volume that are carried in the replication task start message, the second source data volume in the second storage device 120 that stores the same data as the first source data volume, so that the second source data volume corresponding to the replication information can be determined.

FIG. 3*b* and FIG. 3*c* show two implementation manners in which the first storage system 33 determines the replication information according to this embodiment of the present disclosure. In an actual application, the replication information determined by the first storage system 33 in the current replication task may further be determined in another manner according to specific network deployment, and a specific manner in which the first storage system 33 determines the replication information is not limited herein. It should be noted that, in this embodiment of the present disclosure, because the replication task is a replication task executed between the data volumes, all the replication information in this embodiment of the present disclosure refers to replication information of a data volume in a storage device. Generally, one data volume corresponds to one piece of replication information in a replication task.

In step 302, the first storage system 33 determines first replication sub-information and second replication sub-information according to the replication information. The first replication sub-information is used to indicate data that needs to be replicated by the first storage device 110 to the third storage device 130, and the second replication sub-information is used to indicate data that needs to be replicated by the second storage device 120 to the third storage device 130. It should be noted that, when the first replication sub-information and the second replication sub-information are being determined, data ranges indicated by the first replication sub-information and the second replication sub-information need to be determined, so as to prevent data replicated by the first storage device 110 and the second storage device 120 from being repeated.

In an actual application, in a situation, the first replication sub-information and the second replication sub-information may be respectively determined by the first storage device 110 and the second storage device 120 that are in the first storage system 33. Specifically, the first storage device 110 may determine the first replication sub-information according to the replication information determined in step 300 and a preset replication policy, and the second storage device 120 may determine the second replication sub-information according to the replication information determined in step 300 and the preset replication policy. In an actual application, a replication policy may be preset in the first storage device 110, where the replication policy may include a replication ratio, a replication range, and the like. For example, in a situation, the set policy may be: the first storage device 110 performs replication in a direction from a header of a replication bitmap to a tail, the second storage device 120 performs replication in a direction from the tail of the replication bitmap to the header, and replication ends when replication ranges are overlapped. In another situation, the set policy may be: the first storage device 110 replicates 60% differential data in a direction from a header of a replication bitmap to a tail, and the second storage device replicates 40% differential data in a direction from the tail of the replication bitmap to the header. In still another situation, the set policy may further be: the first storage device 110 and the second storage device 120 replicate differential data separately from the middle of a replication bitmap to two ends. In addition, the set policy may further include an address range of the data that needs to be replicated by the first storage device 110, an address range of the data that needs to be replicated by the second storage device 120, and the like. In an actual application, the replication policy may be set according to a specific case, and the specific replication policy is not limited herein.

It should be noted that, because in this embodiment of the present disclosure, when asynchronous replication is started, a current replication task needs to be shared by the first storage device 110 and the second storage device 120, a same replication policy needs to be set in the first storage device 110 and the second storage device 120, so as to prevent the first storage device 110 and the second storage device 120 from replicating same data to the third storage device 130.

In still another situation, to enable the first storage device 110 and the second storage device 120 to implement load balance in the replication process, the first storage device 110 may negotiate with the second storage device 120 according to the replication information, to determine the first replication sub-information and the second replication sub-information. Specifically, as shown in FIG. 1, in a negotiation process, the first storage device 110 may receive a negotiation request of the second storage device 120, where the negotiation request includes at least bandwidth information of a second link. The first storage device 110 may determine the first replication sub-information and the second replication sub-information according to the bandwidth information of the second link. For example, if bandwidth of the second link is greater than bandwidth of a first link, the first storage device 110 may determine that an amount of data indicated by the first replication sub-information is less than an amount of data indicated by the second replication sub-information. For example, the data indicated by the first replication sub-information is 30% of a total amount of data that needs to be replicated, and the data indicated by the second replication sub-information is 70% of the total amount of data that needs to be replicated. After the first storage device 110 determines the first replication sub-information and the second replication sub-information, the first storage device 110 may send the determined second replication sub-information to the second storage device 120. The second replication sub-information may be sent to the second storage device 120 in a form of a negotiation response message, and an address range of the data indicated by the second replication sub-information needs to be carried in the negotiation response message.

It should be noted that, in this embodiment of the present disclosure, both the first replication sub-information and the second replication sub-information are a part of the replication information. Alternatively, in other words, both the data indicated by the first replication sub-information and the data indicated by the second replication sub-information are a part of data indicated by the replication information. It is understandable that, if the first storage system 33 includes only two storage devices, the replication information may consist of the first replication sub-information and the second replication sub-information. In this embodiment of the present disclosure, when the replication information is represented in a manner of a replication bitmap, the first replication sub-information or the second replication sub-information does not need to be represented by using an additional separate replication bitmap, and a range of the first replication sub-information or the second replication sub-information may be identified on the replication bitmap. In this embodiment of the present disclosure, a specific form of the first replication sub-information and the second replication sub-information is not limited, as long as a range of data that needs to be replicated can be identified by the first replication sub-information and the second replication sub-information.

It is understandable that this embodiment of the present disclosure is described only by assuming that the first storage system 33 includes two storage devices. In an actual application, if the first storage system 33 includes N storage devices, when asynchronous replication is started, the replication information in the current replication task may be divided into N parts. In other words, N pieces of replication sub-information may be determined according to the replication information in the current replication task, and the N devices perform replication simultaneously to a third device respectively according to the N pieces of replication sub-information, where N is a natural number greater than 2. When the replication information is represented in a manner of a replication bitmap, the first replication sub-information and the second replication sub-information may also be represented in a manner of a replication bitmap.

In step 304, the first storage device 110 replicates, to the third storage device 130 according to the first replication sub-information, the data that needs to be replicated by the first storage device 110 to the third storage device 130. For example, when the replication information is represented in a manner of a replication bitmap, the first storage device 110 may replicate, to the destination data volume in the third storage device 130 according to the first replication sub-information, data in the first source data volume corresponding to a position with a flag bit of "1" in the replication bitmap. Specifically, the first storage device 110 may send, to the destination data volume in the third storage device 130 by using a write data command or a replication command, data that needs to be replicated by the first source data volume in the first storage device 110 to the third storage device 130.

As shown in FIG. 1, because the first storage device 110 and the third storage device 130 implement data backup by using an asynchronous replication technology, compared with the data stored in the first storage device 110, there is a particular time delay for the data stored in the third storage device 130. Generally, the first storage device 110 receives multiple write data commands of the host 100 in a period of time, and when the first storage device 110 performs remote asynchronous replication to the third storage device 130, the host 100 may still send a write data command to the first storage device 110. Therefore, when the current replication task is being executed, it is necessary to distinguish, from new data received by the first storage device 110, data that is sent by the first storage device 110 to the third storage device 130 in the current replication task.

In this embodiment of the present disclosure, the data that is sent by the first storage device 110 to the third storage device 130 in the replication process and the new data received by the first storage device 110 in the replication process may be distinguished by using a snapshot technology. A snapshot is a fully usable copy of a specified collection of data, where the copy includes an image of corresponding data at a time point (a time point at which the copy begins). The snapshot may be a duplicate of the data represented by the snapshot, or a replica of the data. In this embodiment of the present disclosure, when replication is started, a state view may be created for a data volume at a creation moment, only data at the creation moment of the data volume can be seen by using the view, and modification (new data is written) to the data volume after the time point is not reflected in the snapshot view. Data replication may be performed by using the snapshot view. For the first storage device 110, because snapshot data is "static", the first storage device 110 may replicate snapshot data to the third storage device 130 after creating a snapshot for data at each time point. In this manner, remote data replication may be complete, and that the first storage device 110 continues to receive the write data command sent by the host 100 during replication is not affected. Therefore, the first storage device 110 may perform snapshot processing on the data in the first source data volume at a moment of starting replication to form a data duplicate of the first source data volume at the moment, and send the data duplicate to the destination data volume in the third storage device 130. It should be noted that the data duplicate is the data to be replicated to the third storage device 130 in the current replication task.

Optionally, in this embodiment of the present disclosure, the foregoing problem may also be resolved in a manner of adding a time slice number to each write data command received by the first storage device 110. For example, the first storage device 110 may include a current time slice number manager, where the current time slice number manager saves a current time slice number. The current time slice number may be represented by a value, such as 0, 1, or 2; the current time slice number may also be represented by a letter, such as a, b, or c, which is not limited herein. When the first storage device 110 receives a write data command, a first number assigned by the current time slice number is added to data and an address of the data that are carried in the write data command. When a remote asynchronous replication task is triggered, the data corresponding to the first number is used as data to be replicated to the third storage device 130 in the current replication task, and the data corresponding to the first number and the address of the data are sent to the third storage device 130. The current time slice number is also modified, so as to identify a subsequent write data command. In addition, in this embodiment of the present disclosure, the data that needs to be sent by the first storage device 110 to the third storage device 130 in the current replication task and the new data received by the first storage device 110 may further be distinguished in another manner, which is not limited herein.

In this embodiment of the present disclosure, an example in which a data volume included in a storage space of the first storage device 110 is a LUN is used. When a replication task is started, for example, when the replication information is being determined, the first storage device 110 may create a duplicate of a first source LUN at a current moment by means of snapshot. Then, in step 304, the first storage device 110 may replicate data, in the created duplicate of the first source LUN, of an address corresponding to a grid with a flag bit of "1" in the first replication sub-information to a destination LUN of the third storage device 130. A person skilled in the art may understand that, in this LUN duplicate creation manner, even if new data is written again to the first storage device 110 in the same address of the first source LUN in the current replication task, the data needing to be replicated in the current replication task is not affected.

In this step, an example in which the first storage device 110 replicates the data to the third storage device 130 by using a write data command is used. When the first storage device 110 replicates the data to the destination LUN of the third storage device 130 according to the created duplicate of the first source LUN and the first replication sub-information, the write data command sent by the first storage device 110 to the third storage device 130 needs to include an identifier of the destination LUN, the to-be-written data, and an address of the to-be-written data that are in the current replication task. The identifier of the destination LUN may be a LUN ID. The address of the to-be-written data may be an LBA of the data, for representing a destination address of the data. The third storage device 130 may write the data carried in the write data command to the destination LUN of the third storage device 130 according to the identifier of the destination LUN and the LBA of the to-be-written data. It is understandable that, the write data command sent by the first storage device 110 to the third storage device 130 may further carry an ID of the first source LUN of the to-be-written data, for identifying that the data is data sent from the first source LUN of the first storage device 110.

In step 306, the second storage device 120 replicates, to the third storage device 130 according to the second replication sub-information, the data that needs to be replicated by the second storage device 120 to the third storage device 130. Because step 306 is similar to step 304, reference may be made to a relevant description of step 304. It should be noted that, in this embodiment of the present disclosure, there is no sequence for step 304 and step 306, and the replication process for the first storage device 110 and the replication process for the second storage device 120 may be performed at the same time.

In this embodiment of the present disclosure, the first storage device 110 and the second storage device 120 keep consistency of stored data in a synchronous replication manner, and the replication information in the current replication task is determined according to differential data information written to a data volume. For example, the replication information in the current replication task is determined according to differential data information written to the first source data volume in the first storage device 110. The data stored in the first source data volume in the first storage device 110 is the same as the data stored in the second source data volume in the second storage device 120, and the first replication sub-information and the second replication sub-information are determined according to the same replication information, the first source data volume also stores data the same as the data indicated by the second replication sub-information, and the second source data volume also stores data the same as the data indicated by the first replication sub-information.

In the method shown in FIG. 3, because a first storage device 110 and a second storage device 120 that are in a first storage system 33 store same data, the first storage device 110 and the second storage device 120 may have same replication information. In an asynchronous replication process, the first storage system 33 determines first replication sub-information and second replication sub-information by using the replication information, the first storage device 110 replicates data to a third storage device 130 according to the first replication sub-information, and the second storage device 120 replicates data to the third storage device 130 according to the second replication sub-information. According to the method provided by this embodiment of the present disclosure, a same replication task of the first storage system 33 can be shared by the first storage device 110 and the second storage device 120 that are in the first storage system 33. Compared with the prior art in which only one link is used for replication, in the method shown in FIG. 3, bandwidth of a replication link between the first storage system 33 and a second storage system 44 can be improved without increasing production costs, thereby improving replication efficiency. For example, if bandwidth of both a first link and a second link shown in FIG. 1 is 10 M, according to the method in this embodiment of the present disclosure, when data in a LUN in the first storage system 33 is replicated to the third storage device 130, bandwidth of a replication link may reach 20 M. However, according to the method in the prior art in which only one link is used for replication, bandwidth of a replication link is merely 10 M.

In addition, compared with the prior art in which only one storage device in the first storage system 33 is used for replication, according to the method in the embodiment shown in FIG. 3, when remote asynchronous replication is started, multiple storage devices in the first storage system 33 are used at the same time, so that resource consumption for a single storage device in the first storage system 33 can be reduced.

Figure 4A:
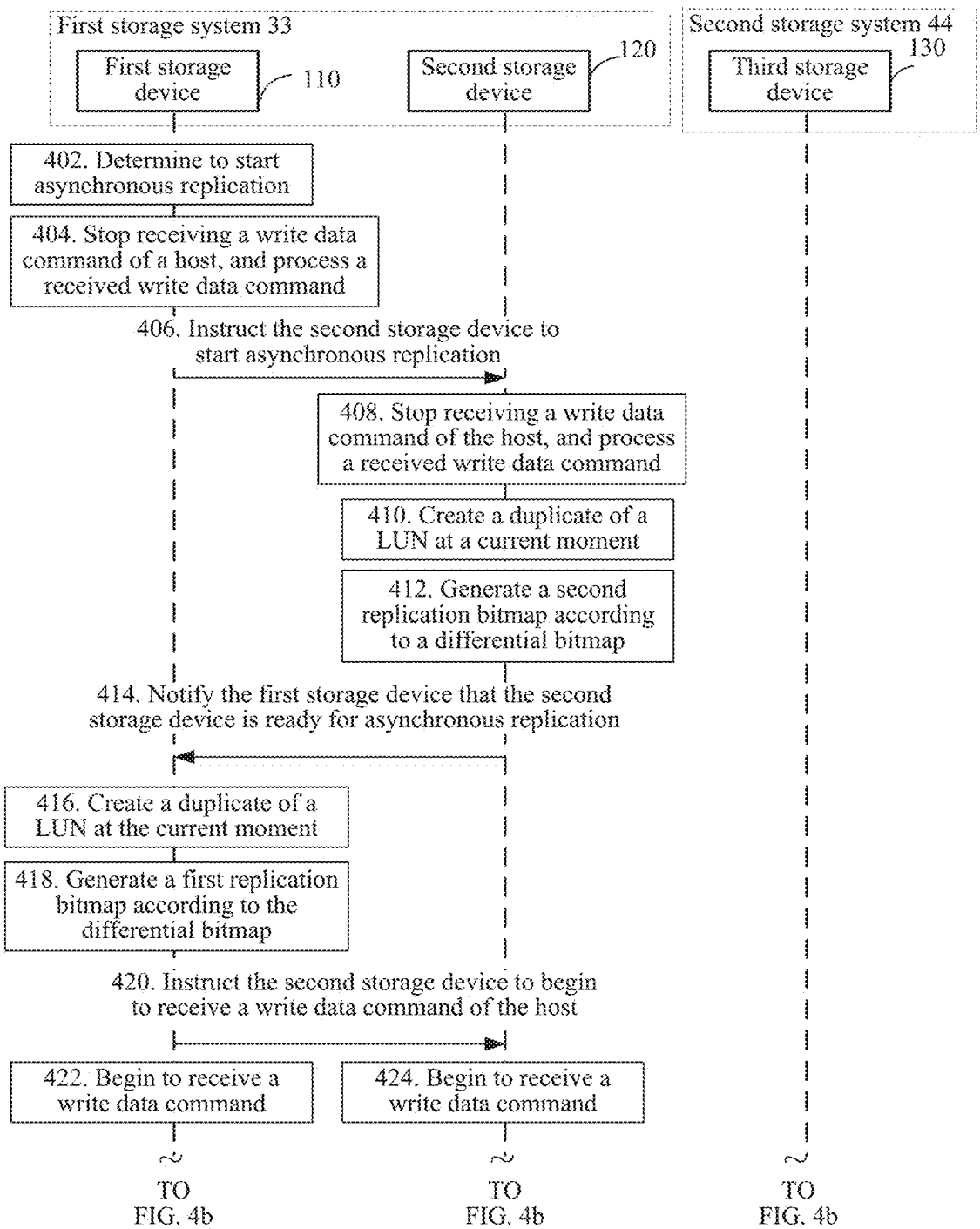
FIG. 4a and FIG. 4b are a signaling diagram of still another data replication method according to an embodiment of the present disclosure.
Figure 4B:
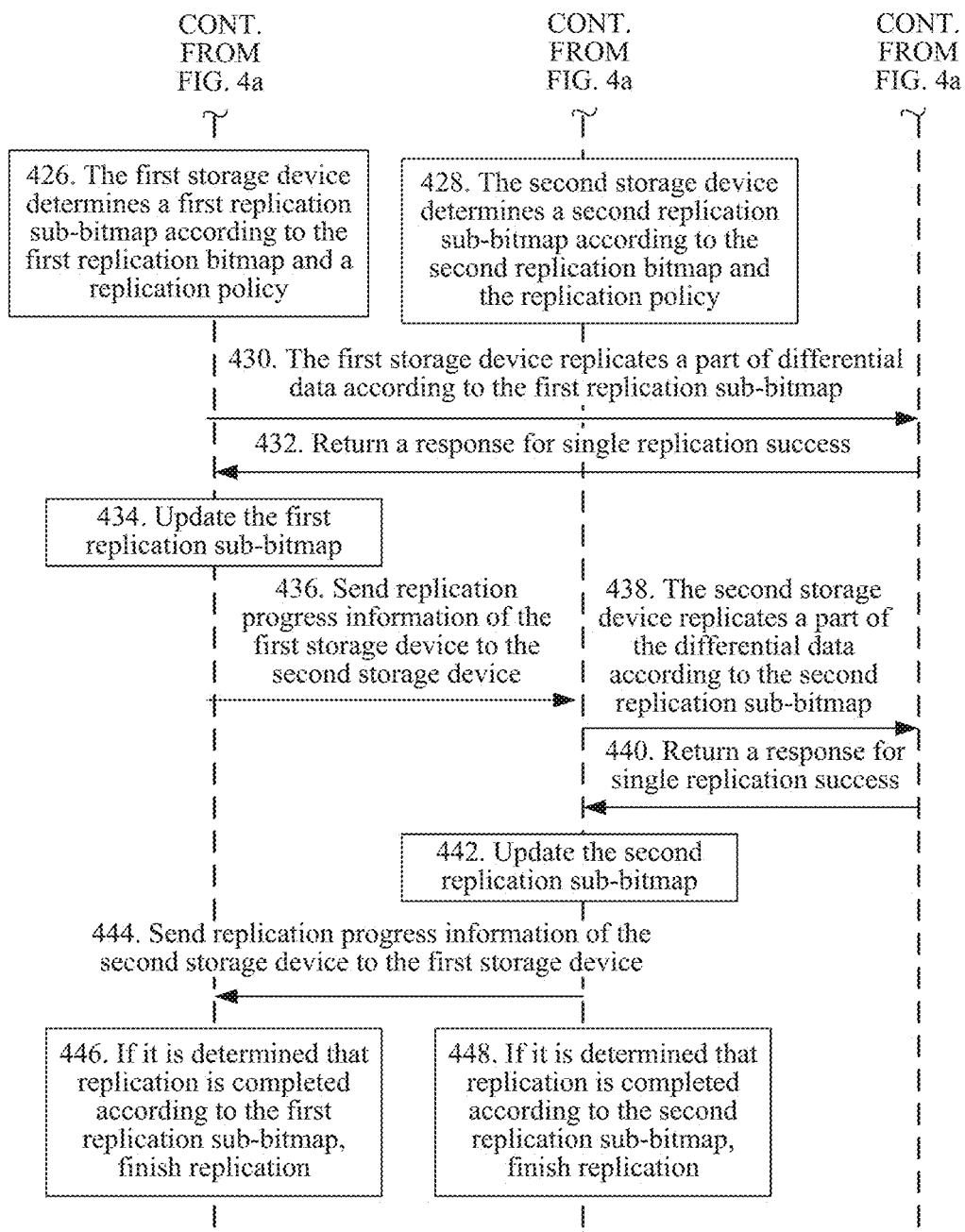

FIG. 4a and FIG. 4b are a signaling diagram of a data replication method according to an embodiment of the present disclosure. In the method shown in FIG. 4a and FIG. 4b, the method shown in FIG. 3 is further described in detail from perspectives of a first storage system 33 and a second storage system 44. It is understandable that specific structures of a first storage device 110, a second storage device 120, and a third storage device 130 in the method shown in FIG. 4a and FIG. 4b may still be shown in FIG. 2. Specifically, the method shown in FIG. 4a and FIG. 4b may be performed separately by a processor in the first storage device 110, a processor in the second storage device 120, and a processor in the third storage device 130. For ease of description, in this embodiment of the present disclosure, replication information is represented by a replication bitmap, and differential data information is represented by a differential bitmap. In this embodiment of the present disclosure, a description is provided still by using an example in which a current replication task is a replication task among a first source data volume in the first storage device 110, a second source data volume in the second storage device 120, and a destination data volume in the third storage device 130. The following describes the method shown in FIG. 4a and FIG. 4b with reference to FIG. 1 and FIG. 3. Specifically, as shown in FIG. 4a and FIG. 4b, the method includes:

In step 402, the first storage device 110 determines to start an asynchronous replication task. In an actual application, the first storage device 110 may determine, according to a set timer, whether to start an asynchronous replication task; when the timer reaches a set asynchronous replication time, the first storage device 110 determines to start the asynchronous replication task. It is understandable that, that the first storage device 110 starts asynchronous replication by setting a timer is merely one implementation manner. In an actual application, the first storage device 110 may further determine, according to an amount of received data, whether to start the asynchronous replication task. When an amount of data received by the first storage device 110 is relatively small, the first storage device 110 may determine to start the asynchronous replication task.

In step 404, the first storage device 110 stops receiving a write data command of a host 100, and processes a received write data command. In an actual application, that the host 100 writes data to the first storage device 110 or the host 100 reads data from the first storage device 110 is implemented by sending an input/output (Input/output, I/O) command to the first storage device 110. In this embodiment of the present disclosure, when the first storage device 110 determines to start an asynchronous replication process to the third storage device, the first storage device may stop receiving the write data command of the host, so that the first storage device 110 may determine, according to data received before reception of the write data command of the host 100 is stopped, data that needs to be replicated by the first source data volume in the current replication task.

In this step, in a case in which the first storage device 110 and the second storage device 120 keep data consistency by means of synchronous replication, processing the received write data command includes writing data to the first storage device 110 and the second storage device 120 according to the received write data command. Specifically, after receiving the write data command sent by the host 100, the first storage device 110 may first temporarily store data carried in the write data command, and then write the data in a cache to a data volume according to a set write policy. At the same time, after learning such a change, a data synchronization engine in the first storage device 110 may immediately send a changed data block from the cache to a cache of the second storage device 120 directly by using a SAN switch. After receiving the data block, the second storage device 120 may send a write success response to the first storage device 110. After receiving the response of the second storage device 120, the first storage device 110 may return a write success response to the host 100, to notify the host 100 that processing of the data in the write data command is completed. In this manner, the data that is written by the host 100 to the first source data volume in the first storage device 110 may be synchronously written to the second source data volume in the second storage device 120. Similarly, data that is written by the host 100 to the second source data volume in the second storage device 120 may also be synchronously written to the first source data volume in the first storage device 110 in a similar manner. The first storage device 110 and the second storage device 120 keep consistency of stored data in the foregoing synchronous replication manner.

In step 406, the first storage device 110 instructs the second storage device 120 to start asynchronous replication. In this embodiment of the present disclosure, the first storage device 110 and the second storage device 120 keep data stored in the first storage device 110 and data stored in the second storage device 120 the same in the synchronous replication manner. To fully use bandwidth of a link between the first storage device 110 and the third storage device 130 and of a link between the second storage device 120 and the third storage device 130, and improve replication efficiency, in a replication process of this embodiment of the present disclosure, the first storage device 110 and the second storage device 120 may jointly complete a same replication task. Therefore, when the first storage device 110 determines to start asynchronous replication, it is required to instruct the second storage device 120 to start the asynchronous replication process.

In this step, the first storage device 110 may send a replication task start message to the second storage device 120. Specifically, in a first situation, the first storage device 110 may notify the second storage device 120 of a replication relationship involved in the current replication task, so that the second storage device 120 can determine, according to a preset replication relationship, an identifier of the data volume that is in the second storage device 120 and that is involved in the current replication task. For example, the first storage device 110 may notify the second storage device 120 of a replication relationship identifier by using the replication task start message. In a second situation, the first storage device 110 may add an identifier of the first source data volume and an identifier of the destination data volume to a replication task start message, so that the second storage device 120 may determine, according to a preset replication relationship, the identifier of the first source data volume, and the identifier of the destination data volume, the second source data volume that is in the second storage device 120 and that is involved in the current replication task. In a third situation, after determining the replication task, the first storage device 110 may determine an identifier of the second source data volume according to a preset replication relationship in the first storage device 110, an identifier of the first source data volume, and an identifier of the destination data volume, and add the identifier of the second source data volume to a replication task start message that is sent to the second storage device 120, so that the second storage device 120 can directly determine the second source data volume in the second storage device 120 according to the received replication task start message. In a fourth situation, the first storage device 110 may add an identifier of the first source data volume to a replication task start message, so that the second storage device 120 may determine, according to the identifier of the first source data volume and a preset replication relationship, the second source data volume that is in the second storage device 120 and that is involved in the current replication task. In a fifth situation, the first storage device 110 may further add an identifier of the destination data volume to a replication task start message, so that the second storage device 120 may determine, according to the identifier of the destination data volume and a preset replication relationship, the second source data volume that is in the second storage device 120 and that is involved in the current replication task. A manner of how the second storage device 120 specifically determines the second source data volume by using the replication task start message is not limited in this embodiment of the present disclosure, as long as the second storage device 120 can determine the second source data volume that stores same data as the first source data volume. For a specific description on the replication task start message, reference may be made to a relevant description in the embodiment shown in FIG. 3, and details are not described herein again.

In step 408, the second storage device 120 stops receiving a write data command of the host 100, and processes a received write data command. Specifically, after receiving a notification, from the first storage device 110, about starting asynchronous replication, the second storage device 120 may stop receiving the write data command of the host 100. Because step 408 is similar to step 404, for a specific description, reference may be made to step 404.

In step 410, the second storage device 120 creates a duplicate of the second source data volume at a current moment. In an actual application, the second storage device 120 may create the duplicate of the second source data volume at the current moment by means of snapshot. In this manner, data that needs to be replicated by the second storage device 120 in the current replication task may be determined, and the data that needs to be replicated in the current replication task and data that is newly received by the second storage device 120 in the current replication task may be distinguished by using the duplicate of the second source data volume. For how to specifically create the duplicate of the second source data volume by using a snapshot technology, reference may be made to the foregoing description, and details are not described herein again.

In step 412, the second storage device 120 generates a second replication bitmap according to a differential bitmap of the second source data volume. In this embodiment of the present disclosure, after receiving the write data command, which is sent by the host 100, for writing data to the second source data volume, the second storage device 120 updates the differential bitmap of the second source data volume according to an address of data carried in the write data command. For example, the second storage device 120 may set a flag bit in a grid, corresponding to the address of the data, in the differential bitmap to "1", for identifying that a data write occurs for the address corresponding to the grid. The differential bitmap of the second storage device 120 is used to record information about data written to the second source data volume in the second storage device 120 after a previous replication task of the current replication task begins and before the current replication task begins. Because this step is similar to step 301, for how to specifically generate the second replication bitmap according to the differential bitmap of the second source data volume in the second storage device 120, reference may be made to a description on step 301.

In step 414, the second storage device 120 notifies the first storage device 110 that the second storage device 120 is ready for asynchronous replication. In an actual application, in order to make both the first storage device 110 and the second storage device 120 ready for asynchronous replication when replication begins, for example, both the first storage device 110 and the second storage device 120 have prepared a replication bitmap and a duplicate of the data volume, after the second storage device 120 generates the second replication bitmap and creates the duplicate of the second source data volume required in the current replication task, the second storage device 120 may notify the first storage device 110 that the second storage device 120 is ready for asynchronous replication.

In step 416, the first storage device 110 creates a duplicate of the first source data volume at the current moment. After the first storage device 110 determines that the second storage device 120 is ready for asynchronous replication, the first storage device 110 begins to create the duplicate of the first source data volume at the current moment. This step is similar to step 410, reference may be made to a description on step 410 for details, and details are not described herein again.

In step 418, the first storage device 110 generates a first replication bitmap according to a differential bitmap of the first source data volume. Because step 418 is similar to step 412, reference may be made to a description on step 412 for details. It should be noted that, because in this embodiment of the present disclosure, the first storage device 110 and the second storage device 120 keep consistency of stored data by using a synchronous replication technology, and data stored in the first source data volume is the same as data stored in the second source data volume, the first replication bitmap of the first storage device 110 is the same as the second replication bitmap of the second storage device 120.

In step 420, the first storage device 110 instructs the second storage device 120 to begin to receive a write data command of the host 100. To synchronize the first storage device 10 and the second storage device 120, after determining that the first storage device 110 and the second storage device 120 are already ready for replication in the current replication task, the first storage device 110 may instruct the second storage device 120 to begin to receive the write data command of the host 100. This is because the write data command of the host 100 received after the devices are ready for replication does not affect execution of the current replication task.

In step 422, the first storage device 110 begins to receive a write data command of the host 100. In step 424, the second storage device 120 begins to receive a write data command of the host 100. It is understandable that, data written to the first storage device 110 and the second storage device 120 after the current replication task is started will be replicated to the third storage device 130 in a next replication task.

It should be noted that, in an actual application, step 404, step 408, step 410, step 416, and step 420 to step 424 are optional. For example, as described above, if data that needs to be replicated by a storage device in the current replication task is determined in a manner of adding a time slice number, when asynchronous replication is started, the first storage device 110 and the second storage device 120 may not stop receiving the write data command of the host 100, or may not necessarily create a duplicate of a LUN.

In step 426, the first storage device 110 determines first replication sub-information according to the first replication bitmap and a replication policy. In step 428, the second storage device 120 determines the second replication sub-information according to the second replication bitmap and the replication policy. In this embodiment of the present disclosure, because the first replication bitmap is the same as the second replication bitmap, and the preset replication policy is also the same, the first storage device 110 and the second storage device 120 may separately determine a replication sub-bitmap. The replication sub-bitmap herein may specifically include a first replication sub-bitmap determined by the first storage device 110 and a second replication sub-bitmap determined by the second storage device 120. The first replication sub-bitmap is used to identify information about data that needs to be replicated by the first storage device 110 to the third storage device 130, and the second replication sub-bitmap is used to identify information about data that needs to be replicated by the second storage device 120 to the third storage device 130. It is understandable that, a specific replicate range for the first storage device 110 and the second storage device 120 may be specified in the replication policy. Therefore, the data indicated by the first replication sub-bitmap and the data indicated by the second replication sub-bitmap may not be repeated. Step 426 and step 428 are similar to step 302, and reference may be made to a relevant description on step 302 for details.

In step 430, the first storage device 110 replicates a part of differential data to the third storage device 130 according to the first replication sub-bitmap. Specifically, during replication, the first storage device 110 may replicate a part of the differential data according to a replication rule of the first storage device 110 in one replication process of the current replication task. For example, a quantity of LBAs of data blocks duplicated once may be set in the replication rule.

In step 432, the third storage device 130 returns a response for single replication success to the first storage device 110, to notify the first storage device 110 that the data replicated this time has been successfully written to the third storage device 130.

In step 434, the first storage device 110 updates the first replication sub-bitmap according to the response for single replication success returned by the third storage device 130. Specifically, when the first replication sub-bitmap is being updated, a replication completion identifier may be marked in a grid, in the first replication sub-bitmap, corresponding to an address of data that has been replicated, or a flag bit in a grid, in the first replication sub-bitmap, corresponding to the address of the data that has been replicated may be deleted. For example, a flag bit "1" in a grid, in the first replication sub-bitmap, corresponding to the address of the data that has been replicated may be deleted. It is understandable that, because the first replication sub-bitmap is a part of the first replication bitmap, updating the first replication sub-bitmap is updating the first replication bitmap.

In step 436, the first storage device 110 sends replication progress information of the first storage device 110 to the second storage device 120. In this embodiment of the present disclosure, each time the first storage device 110 finishes replicating differential data, the first storage device 110 needs to send the replication progress information of the first storage device 110 to the second storage device 120, so that the second storage device 120 may know replication progress of the first storage device 110. If a fault occurs on the first storage device 110 in the replication process, the second storage device 120 may take over the replication task of the first storage device 110 according to the replication progress information of the first storage device 110. To distinguish the replication progress information of the first storage device 110 from replication progress information of the second storage device 120, in this embodiment of the present disclosure, the replication progress information of the first storage device 110 is referred to as first replication progress information, and the replication progress information of the second storage device 120 is referred to as second replication progress information.

In an actual application, the first storage device 110 may send the first replication progress information to the second storage device 120 in a form of a replication progress message. A format of the replication progress message may be similar to a format of the foregoing replication task start message. A message type (for example, opCode) field, a source device ID (for example, srcAppId) field, and a destination device ID (for example, dstAppId) field may also be included in a header of the replication progress message. The message type field is used to represent that a type of the message is replication progress information. In addition to carrying a source data volume and a destination data volume in the current replication task, a content part (for example, a data field of the replication progress message) of the replication progress message further needs to carry current replication progress information. For example, a format of the content part of the replication progress message may be shown as follows:

| Byte | 0 | 1 | 2 | 3 |
|---|---|---|---|---|
| 0 | LUN ID | | | |
| 4 | ReplicationObject LUN id | | | |
| 8 | Address | | | | where for a description on the "LUN ID" field and the "ReplicationObject LUN id" field, reference may be made to the foregoing description on the replication task start message, and details are not described herein again.

Address: the field may be located after the eighth byte, and is used to carry the current replication progress information. The replication progress information may be one or more logical block addresses (Logical Block Address, LBA) or an updated replication bitmap, for example, may be an updated first replication sub-bitmap. When the replication progress information is one LBA, the replication progress information may be represented by an LBA of a last piece of data that has been replicated. When the replication progress information is multiple LBAs, the replication progress information may be represented by addresses of all data that has been replicated currently. A specific form of the replication progress information is not limited herein, as long as the replication progress information can represent replication progress.

For example, in the first replication progress information sent by the first storage device 110 to the second storage device 120, in a header of the first replication information message, a "source device ID" field may be an IP address of the first storage device 110, and a "destination device ID" field may be an IP address of the second storage device 120. In a content part of the first replication progress information, a "LUN ID" field may be an ID of the first source data volume in the first storage device 110 that stores to-be-replicated data; a "ReplicationObject LUN id" field may be an ID of the destination data volume in the third storage device 130; and an "Address" field may be an LBA of the last piece of data that has been replicated. It should be noted that, in this embodiment of the present disclosure, because a replication relationship is established in advance among the first source data volume in the first storage device 110, the second source data volume in the second storage device 120, and the destination data volume in the third storage device 130, the second storage device 120 may determine, according to the LUN id field in the first replication progress information and the preset replication relationship, the second source data volume in the second storage device 120 corresponding to the current replication task. In addition, an ID of a LUN corresponding to the first storage device 110 and an ID of a LUN corresponding to the second storage device 120 may be the same or may be different, as long as data volumes that store same data can be determined according to the replication relationship.

In step 438, the second storage device 120 replicates a part of the differential data to the third storage device 130 according to the second replication sub-bitmap. In step 440, the third storage device 130 returns a response for a single replication success to the second storage device 120, to notify the second storage device 120 that the data replicated this time has been successfully written to the third storage device 130. In step 442, the second storage device 120 updates the second replication sub-bitmap according to the response for single replication success returned by the third storage device 130. In step 444, the second storage device 120 sends the replication progress information of the second storage device 120 to the first storage device 110.

It should be noted that, one replication process of the second storage device 120 in the current replication task is described in step 438 to step 444, and the process is similar to one replication process, described in step 430 to step 436, of the first storage device 110 in the current replication task. Therefore, for descriptions on step 438 to step 444, reference may be made respectively to relevant descriptions on step 430 to step 436.

In step 446, when the first storage device 110 determines that replication is completed according to the first replication sub-bitmap, the first storage device 110 finishes the current replication task. In the replication process, the first storage device 110 circularly executes actions in step 430 to step 436, and the first storage device 110 may finish this replication task until the first storage device 110 determines that the data that needs to be replicated by the first storage device 110 has been replicated according to the first replication sub-bitmap. It is understandable that, if the first replication sub-bitmap is determined according to the preset replication policy, and it is set in the preset replication policy that the first storage device 110 performs replication in a direction from a start address of data indicated by the replication bitmap to an end address, and that the second storage device 110 performs replication in a direction from the end address of the data indicated by the replication bitmap to the start address, the first storage device 110 determines to finish the current replication task when determining, according to the replication progress information of the second storage device 120, that there is repetition between the data needing to be replicated by the first storage device 110 and the data that has been replicated by the second storage device 120. It should be noted that, after the current replication task is finished, the duplicate, of the first source data volume in the first storage device 110, created by the first storage device 110 in step 416 needs to be deleted.

In step 448, when the second storage device 120 determines that replication is completed according to the second replication sub-bitmap, the second storage device 120 finishes the current replication task. In the replication process, the second storage device 120 circularly executes actions in step 438 to step 444, and the second storage device 120 may finish the current replication task until the second storage device 120 determines that the data that needs to be replicated by the second storage device 120 has been replicated according to the second replication sub-bitmap. It should be noted that, after the current replication task is finished, the duplicate, of the second source data volume in the second storage device 120, created by the second storage device 120 in step 410 needs to be deleted.

It should be noted that, in the replication process, the first storage device 110 and the second storage device 120 may separately execute the replication task. In this embodiment of the present disclosure, a sequence in which the first storage device 110 executes step 430 to step 436 and the second storage device 120 executes step 438 to step 444 is not limited.

In still another situation, if a fault occurs on the first storage device 110 in the replication process, after the second storage device 120 determines that a fault occurs on the first storage device 110, the second storage device 120 may determine, according to the second replication bitmap and replication progress information of the first storage device 110 that is received last time before the fault occurs on the first storage device 110, data that has not been replicated by the first storage device 110, and replicate, from the second source data volume to the destination data volume in the third storage device 130, the data that has not been replicated by the first storage device 110.

In an actual application, the second storage device 120 may detect, according a heartbeat between the second storage device 120 and the first storage device 110, whether a fault occurs on the first storage device 110. For example, when the second storage device 120 does not receive a heartbeat signal of the first storage device 110 within a set time, the second storage device 120 may determine that a fault occurs on the first storage device 110. Further, to improve detection accuracy, after determining, according to the heartbeat, that a fault occurs on the first storage device 110, the second storage device 120 may send a query request to the third storage device 130, where the query request is used to query a communication status between the first storage device 110 and the third storage device 130, and if a query response returned by the third storage device 130 reveals that communication between the first storage device 110 and the third storage device 130 is already interrupted, the second storage device 120 may determine that a fault occurs on the first storage device 110. The second storage device 120 may take over the replication task of the first storage device 110, and replicate, to the third storage device 130, data that has not been replicated by the first storage device 110 to the third storage device 130.

In this embodiment of the present disclosure, because the second storage device 120 may also notify the first storage device 110 of the replication progress information of the second storage device 120, if a fault occurs on the second storage device 120 in the replication process, the first storage device 110 may also take over the replication task of the second storage device 120 according to the replication progress information of the second storage device 120 and the first replication bitmap, and replicate, to the third storage device 130, data that has not been replicated by the second storage device 120 to the third storage device 130. The process is similar to the foregoing process in which the second storage device 120 takes over the replication task of the first storage device 110, reference may be made to the foregoing description for details, and details are not described herein again.

The method shown in FIG. 4a and FIG. 4b is based on the method shown in FIG. 3. In a replication process, a first storage device 110 and a second storage device 120 notify each other of replication progress. Therefore, in the replication process, if a fault occurs on the first storage device 110 or the second storage device 120, one storage device on which no fault occurs in a first storage system 33 can continue to complete a replication task of a storage device on which a fault occurs. Therefore, even though a fault occurs on one of the storage devices, the replication task of the first storage system 33 may not be interrupted, thereby further enhancing system stability at the time of improving replication efficiency.

Figure 5:
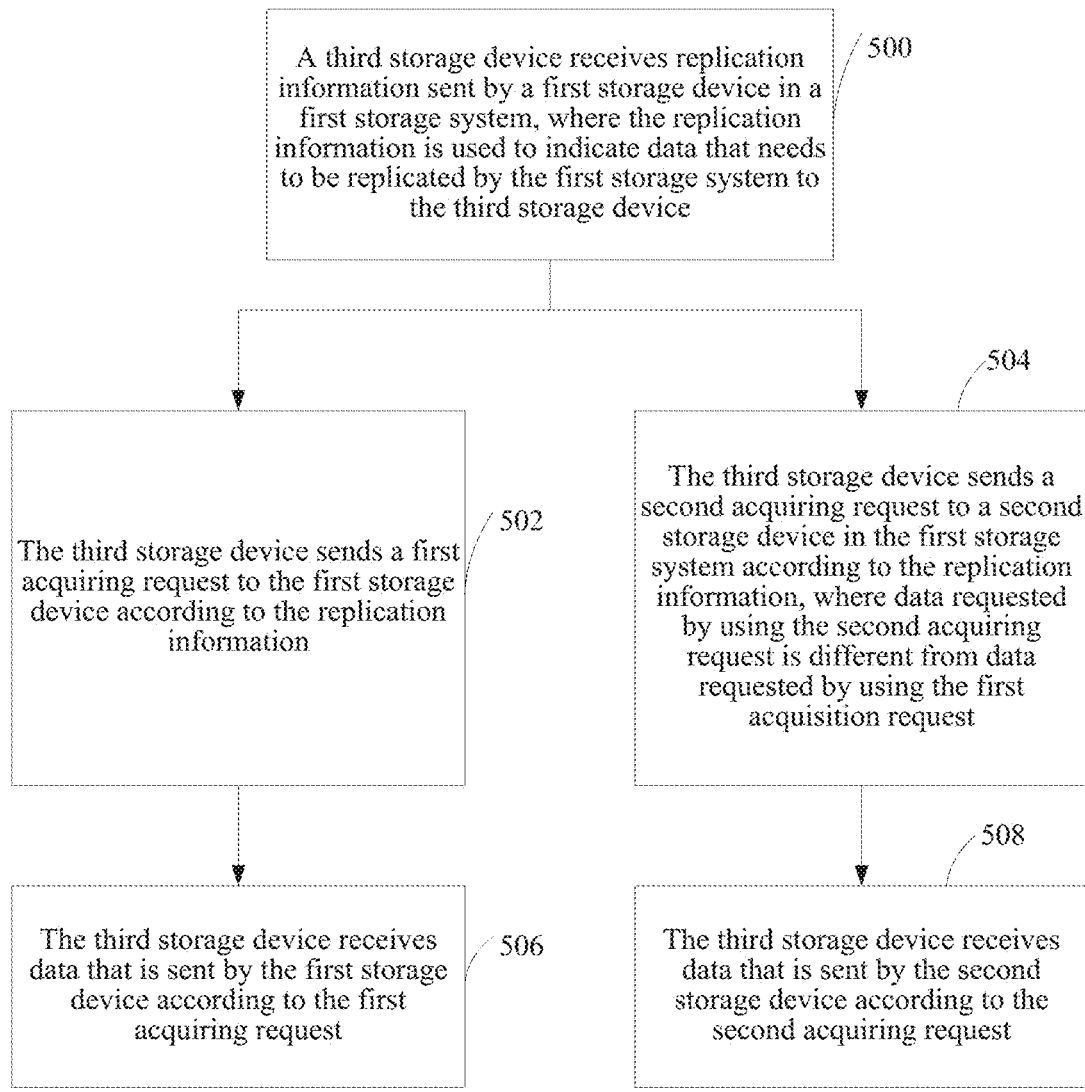
FIG. 5 is a flowchart of still another data replication method according to an embodiment of the present disclosure.

FIG. 5 is a flowchart of still another data replication method according to an embodiment of the present disclosure. In the method shown in FIG. 5, a 3DC disaster recovery system including three storage devices is still used as an example. The method shown in FIG. 5 is described from a perspective of a second storage system 44 that receives data, where a first storage system 33 includes a first storage device 110 and a second storage device 120, and the second storage system 44 may include the third storage device 130 in the level-2 site 13 shown in FIG. 1. In this embodiment of the present disclosure, a description is provided still by using an example in which a current replication task is a replication task among a first source data volume in the first storage device 110, a second source data volume in the second storage device 120, and a destination data volume in the third storage device 130. The following describes the method shown in FIG. 5 with reference to FIG. 1. As shown in FIG. 5:

In step 500, the third storage device 130 receives replication information sent by the first storage system 33, where the replication information is used to indicate data that needs to be replicated by the first storage system 33 to the third storage device 130. In an actual application, when an asynchronous replication task between the first storage system 33 and the second storage system 44 is started, the first storage device 110 or the second storage device 120 in the first storage system 33 may send the replication information to the third storage device 130 in the second storage system 44. An example in which the first storage device 110 sends the replication information to the third storage device 130 is used below. Specifically, the first storage device 110 in the first storage system 33 may determine the replication information according to data stored in the first source data volume. The replication information may be obtained according to differential data information of the first source data volume in the first storage device 110 when the current replication task begins. After determining the replication information in the current replication task, the first storage device 110 may send the determined replication information to the third storage device 130. The replication information may be represented in a form of a replication bitmap, or may be represented in another structure form such as a tree structure, which is not limited herein. For a relevant description on the replication information and the differential data information, reference may be made to a description on step 300 in FIG. 3, and details are not described herein again.

In an actual application, the first storage device 110 may send the replication information to the third storage device 130 by sending a replication task start message to the third storage device 130. The replication task start message carries an identifier of the first source data volume and the replication information that is determined according to the data stored in the first source data volume. For a specific description on the replication task start message, reference may be made to a relevant description in the embodiment shown in FIG. 3, or FIG. 4*a* and FIG. 4*b*.

In step 502, the third storage device 130 sends a first acquisition request to the first storage device 110 according to the replication information. The first acquisition request includes information about data that needs to be acquired by the third storage device 130 from the first storage device 110. The information about the data included in the first acquisition request includes at least an identifier of a data volume to which the data that needs to be acquired belongs and address information of the data. For example, the information about the data included in the first acquisition request includes at least the identifier of the first source data volume and an address of the data requested by using the first acquisition request. The identifier of the data volume to which the data that needs to be acquired belongs may be an identifier of a LUN, and the address of the data may be an LBA.

In an actual application, the first acquisition request may be in a command format such as a read command or a replication command, which is not limited herein. Alternatively, the third storage device 130 may prepare a storage space according to the received replication information, and then send the first acquisition request to the first storage device 110, so that data that is sent by the first storage device 110 according to the first acquisition request can be received and stored in a timely manner.

It should be noted that, in this step, for the command format of the first acquisition request, reference may be made to the format of the replication progress message in step 436, and a message type in the first acquisition request needs to specify that the message is an acquisition request. The information, which needs to be carried in the first acquisition request, about the requested data may include: an identifier of the first source data volume in the first storage device in which the data that needs to be acquired in the current replication task is located and an address of the data.

In step 504, the third storage device 130 sends a second acquisition request to the second storage device 120 in the first storage system 33 according to the replication information. The second acquisition request includes information about data that needs to be acquired by the third storage device 130 from the second storage device 120. Specifically, after receiving the replication task start message sent by the first storage device 110, the third storage device 130 may determine the second source data volume in the second storage device 120 and the destination data volume in the third storage device 130 according to the preset identifier of the first source data volume and a preset replication relationship. Data stored in the second source data volume is the same as the data stored in the first source data volume, and the destination data volume is configured to store data received by the third storage device 130 in the current replication task. After determining the second source data volume, the third storage device 130 may send the second acquisition request to the second storage device 120, and the information, which is included in the second acquisition request, about the requested data includes at least an identifier of the second source data volume in the second storage device and an address of the data requested by using the second acquisition request. For a specific description on the replication relationship, reference may be made to a description in the embodiment shown in FIG. 3.

It is understandable that, to prevent data replicated by the first storage device 110 and the second storage device 120 from being repeated, the address of the data in the second acquisition request is different from the address of the data in the first acquisition request. In this manner, the data requested by using the second acquisition request is different from the data requested by using the first acquisition request. Because step 504 is similar to step 502, for a relevant description on the second acquisition request, reference may be made to a description on step 502.

It should be noted that, in this embodiment of the present disclosure, there is no sequence for step 502 and step 504, and the third storage device 130 may simultaneously send a request separately to the first storage device 110 and the second storage device 120, so as to acquire data separately from the first storage device 110 and the second storage device 120.

Preferably, to enable the first storage device 110 and the second storage device 120 to implement load balance in a replication process, in step 502, when the third storage device 130 sends the first acquisition request to the first storage device 110, the third storage device 130 may determine, according to bandwidth of a link between the third storage device 130 and the first storage device 110, an amount of data to be acquired from the first storage device 110. Specifically, after determining, according to the received replication information and the bandwidth of the link between the third storage device 130 and the first storage device 110, the data that needs to be acquired from the first storage device 110, the third storage device 130 may send the first acquisition request to the first storage device 110 according to the determined data that needs to be acquired from the first storage device 110. Similarly, in step 504, when the third storage device 130 sends the second acquisition request to the second storage device 120, the third storage device 130 may also determine, according to bandwidth of a link between the third storage device 130 and the second storage device 120, an amount of requested data from the second storage device 120. Specifically, after determining, according to the received replication information and the bandwidth of the link between the third storage device 130 and the second storage device 120, the data that needs to be acquired from the second storage device 120, the third storage device 130 may send the second acquisition request to the second storage device 120 according to the determined data that needs to be acquired from the second storage device 120.

In step 506, the third storage device 130 receives data that is sent by the first storage device 110 according to the first acquisition request. Specifically, the first storage device 110 may send corresponding data stored in the first source data volume to the third storage device 130 according to the address, of the data that needs to be acquired, carried in the first acquisition request, to replicate the data to the destination data volume in the third storage device 130.

In step 508, the third storage device 130 receives data that is sent by the second storage device 120 according to the second acquisition request. The second storage device 120 may also send corresponding data stored in the second source data volume to the third storage device 130 according to the address, of the data that needs to be acquired, carried in the second acquisition request, to replicate the data to the destination data volume in the third storage device 130.

In the method shown in FIG. 5, because a third storage device 130 may receive replication information, in a current replication task, sent by a first storage device 110, the third storage device 130 may simultaneously acquire data from the first storage device 110 and a second storage device 120, thereby improving replication link bandwidth and replication efficiency. Further, the third storage device 130 may autonomously select ranges of data acquired from the first storage device 110 and the second storage device 120 after preparing a storage space, so that autonomy of the third storage device 130 is stronger, and an operation is more flexible. In addition, when acquisition data from the first storage device 110 and the second storage device 120, the third storage device 130 may determine, according to link bandwidth, an amount of requested data from the first storage device 110 or the second storage device 120, so that the first storage device 110 and the second storage device 120 can implement load balance in the current replication task.

Figure 6A:
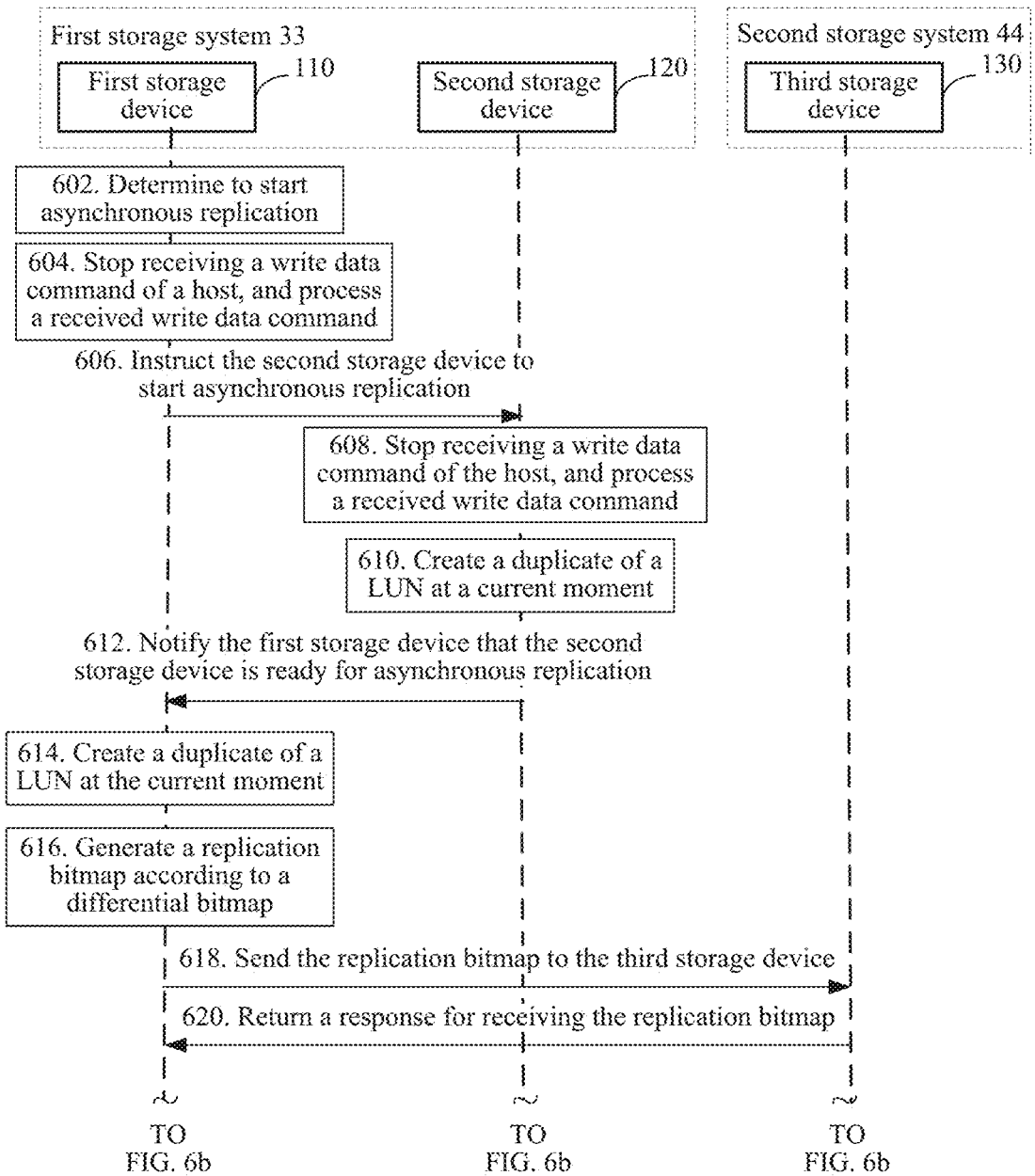
FIG. 6a and FIG. 6b are a signaling diagram of still another data replication method according to an embodiment of the present disclosure.
Figure 6B:
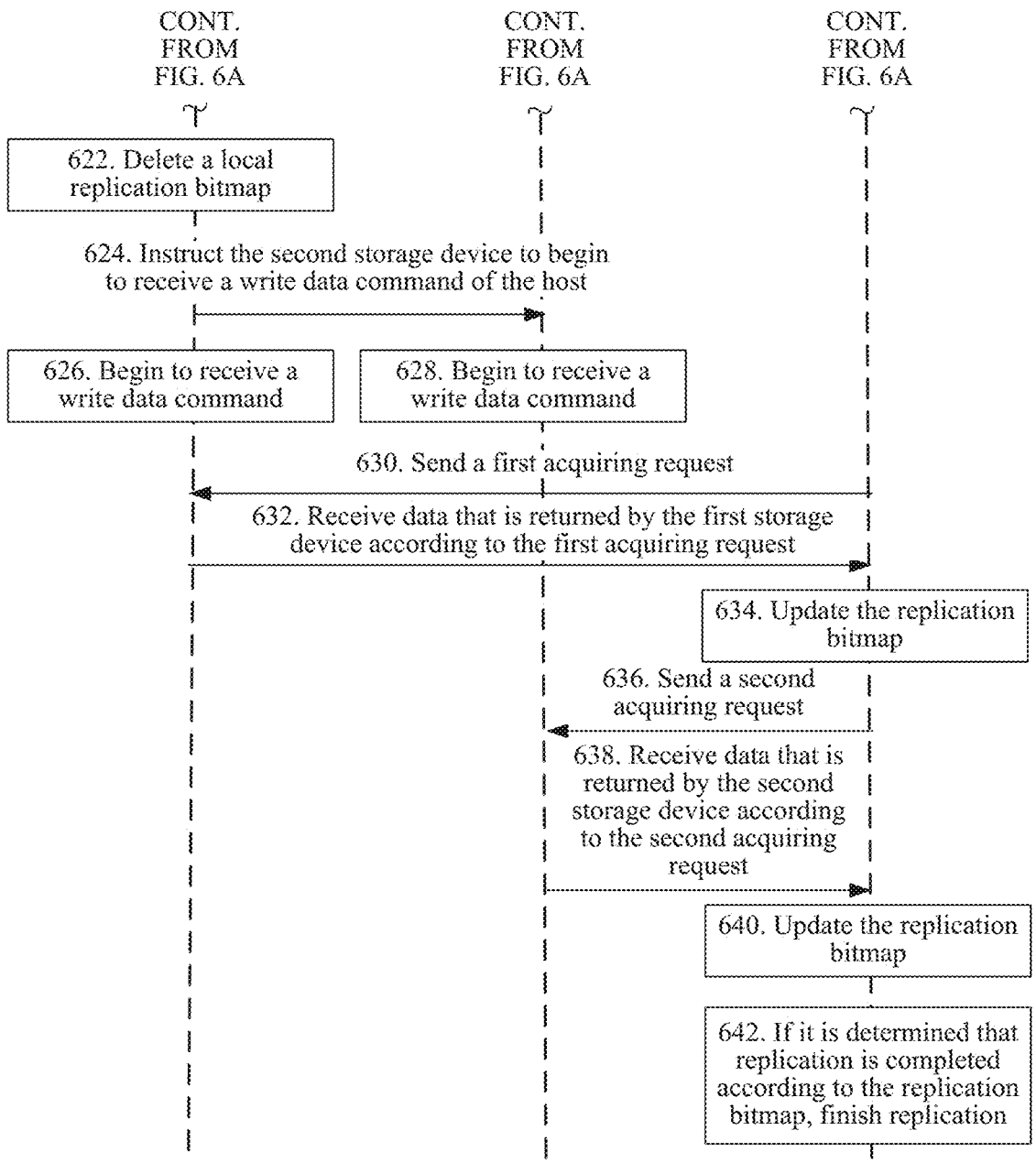

FIG. 6a and FIG. 6b are a signaling diagram of still another data replication method according to an embodiment of the present disclosure. In the method, how data in a first storage system 33 is replicated to a second storage system 44 is described still by using the 3DC disaster recovery system including three storage devices shown in FIG. 1 as an example. For ease of description, in this embodiment of the present disclosure, replication information is represented by a replication bitmap, and differential data information is represented by a differential bitmap for description. The following describes FIG. 6a and FIG. 6b with reference to FIG. 1. Specifically, as shown in FIG. 6a and FIG. 6b, the method may include the following steps.

In step 602, a first storage device 110 determines to start an asynchronous replication task. In step 604, the first storage device 110 stops receiving a write data command of a host 100, and processes a received write data command. In step 606, the first storage device 110 instructs a second storage device 120 to start asynchronous replication. In step 608, the second storage device 120 stops receiving a write data command of the host, and processes a received write data command. In step 610, the second storage device 120 creates a duplicate of a LUN at a current moment. In step 612, the second storage device 120 notifies the first storage device 110 that the second storage device 120 is ready for asynchronous replication. In step 614, the first storage device 110 creates a duplicate of a LUN at the current moment. In step 616, the first storage device 110 generates a replication bitmap according to a differential bitmap.

The foregoing steps are similar to step 402 to step 410 and step 414 to step 418 in the embodiment shown in FIG. 4a and FIG. 4b, and reference may be made to descriptions separately on the relevant steps in FIG. 4a and FIG. 4b for details.

In step 618, the first storage device 110 sends the replication bitmap to a third storage device 130. Specifically, when sending the replication bitmap, the first storage device 110 may send the replication bitmap to the third storage device 130 still in a manner of adding the replication bitmap to a content part of a replication task start message. For a specific description on the replication task start message, reference may be made to a relevant description in the embodiment shown in FIG. 3, FIG. 4a and FIG. 4b, or FIG. 5.

In step 620, the third storage device 130 returns, to the first storage device 110, a response for receiving the replication bitmap. In step 622, the first storage device 110 deletes a local replication bitmap. Specifically, after the first storage device 110 successfully sends the replication bitmap to the third storage device 130, the first storage device 110 may delete the local replication bitmap to save resources. It should be noted that, in the embodiment shown in FIG. 6a and FIG. 6b, the second storage device 120 may further generate a replication bitmap and then send the replication bitmap to the third storage device 130, which is not limited herein. In the embodiment shown in FIG. 6a and FIG. 6b, it is unnecessary for both the first storage device 110 and the second storage device 120 to generate a replication bitmap, as long as the first storage device 110 or the second storage device 120 generates one replication bitmap.

In step 624, the first storage device 110 instructs the second storage device 120 to begin to receive a write data command of the host. In step 626, the first storage device 110 begins to receive a write data command of the host 100. In step 628, the second storage device 120 begins to receive a write data command of the host 100. Step 624 to step 628 are respectively similar to step 420 to step 424 in FIG. 4a and FIG. 4b, and reference may be made to relevant descriptions on step 420 to step 424 in FIG. 4a and FIG. 4b for details.

In step 630, the third storage device 130 sends a first acquisition request to the first storage device 110 according to the replication bitmap. The first acquisition request includes address information of data that needs to be acquired by the third storage device 130 from the first storage device 110. Step 630 is similar to step 503 in FIG. 5, and reference may be made to a relevant description on step 503 in the embodiment shown in FIG. 5 for details.

In step 632, the third storage device 130 receives data that is sent by the first storage device 110 according to the first acquisition request. Step 632 is similar to step 506 in FIG. 5, and reference may be made to a relevant description on step 506 in the embodiment shown in FIG. 5 for details.

In step 634, the third storage device 130 updates the replication bitmap according to the received data. Specifically, the third storage device 130 may update the replication bitmap according to the address information of the received data. Specifically, when the replication bitmap is being updated, a replication completion identifier may be marked in a grid, in the replication bitmap, corresponding to an address of data that has been replicated, or a flag bit in a grid, in the replication bitmap, corresponding to an address of data that has been replicated may be deleted. For example, a flag bit "1" in a grid, in the replication bitmap, corresponding to the address of the data that has been replicated may be deleted. In an actual application, the third storage device 130 may update the replication bitmap each time data is received, which is not limited herein.

In step 636, the third storage device 130 sends a second acquisition request to the second storage device 120 according to the replication bitmap. The second acquisition request includes address information of data that needs to be acquired by the third storage device 130 from the second storage device 120. It should be noted that, to prevent data replicated by the first storage device 110 and the second storage device 120 from being repeated, the data requested by using the second acquisition request is different from the data requested by using the first acquisition request. This step is similar to step 504, and reference may be made to a relevant description on step 504 for details.

In step 638, the third storage device 130 receives data that is returned by the second storage device 120 according to the second acquisition request. In step 640, the third storage device 130 updates the replication bitmap according to the received data sent by the second storage device 120. Step 638 to step 640 are respectively similar to step 632 to step 634, and reference may be made to relevant descriptions on step 632 to step 634 for details.

It should be noted that, in this embodiment of the present disclosure, there is no sequence for step 630 to step 634 and step 636 to step 640, and the third storage device 130 may simultaneously send a request separately to the first storage device 110 and the second storage device 120, so as to acquire data separately from the first storage device 110 and the second storage device 120.

In step 642, if the third storage device 130 determines, according to an updated replication bitmap, that the current replication task is complete, the third storage device 130 finishes the current replication task. In an actual application, step 630 to step 640 may be executed circularly, and each time data is to be acquired, the third storage device 130 may send an acquisition request to the first storage device 110 or the second storage device 120, and update the replication bitmap according to received data. When determining, according to the updated replication bitmap, that all data that needs to be replicated has been replicated, the third storage device 130 may finish the current replication task, and no longer send an acquisition request to the first storage device 110 or the second storage device 120. It is understandable that, after the current replication task is completed, the third storage device 130 may delete the replication bitmap.

In still another situation, if in a replication process, the third storage device 130 determines that a fault occurs on either of the first storage device 110 and the second storage device 120, the third storage device 130 may send an acquisition request to a storage device on which no fault occurs, to request the storage device, on which no fault occurs, of the first storage device 110 and the second storage device 120 to send, to the third storage device 130, data that has not been replicated. It is understandable that, the third storage device 130 may determine, according to whether a heartbeat signal of the first storage device 110 or the second storage device 120 is received within a set time or according to whether data sent by the first storage device 110 or the second storage device 120 is received within a set time, whether the first storage device 110 or the second storage device 120 is faulty, and a method for how the third storage device 130 determines whether the first storage device 110 or the second storage device 120 is faulty is not limited herein.

In the embodiment shown in FIG. 6a and FIG. 6b, the third storage device 130 may simultaneously acquire to-be-replicated data from the first storage device 110 and the second storage device 120 in the first storage system 33. Therefore, replication link bandwidth is improved. In addition, when a fault occurs on one storage device in the first storage system 33, the third storage device 130 may continue to acquire data from a storage device on which no fault occurs, so that even though a fault occurs on one of the storage devices, the replication task of the first storage system 33 may not be interrupted, thereby further enhancing system stability at the time of improving replication efficiency.

It should be noted that, in the foregoing embodiments, all descriptions are provided by using an example in which the first storage device 110 and the second storage device 120 keep data consistency by using a synchronous replication technology. In an actual application, the first storage device 110 and the second storage device 120 may also keep consistency of stored data by means of asynchronous replication, as long as it is ensured that the first storage device 110 and the second storage device 120 in the first storage system 33 store same data when the replication task from the first storage system 33 to the second storage system 44 is started, which is not limited herein.

Figure 7:
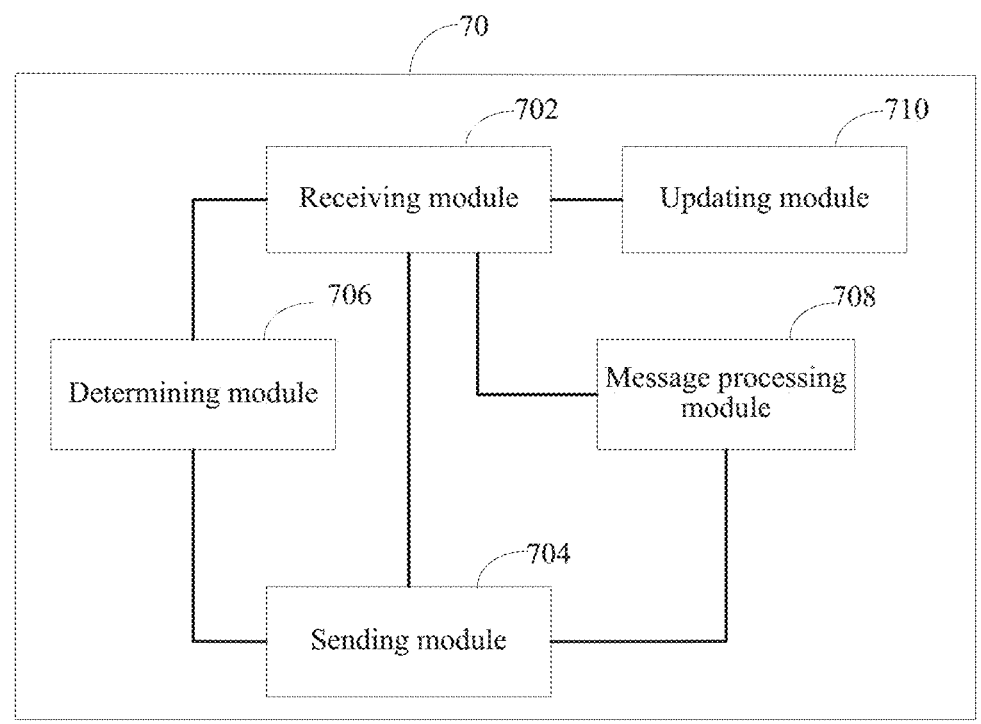
FIG. 7 is a schematic structural diagram of a storage system according to an embodiment of the present disclosure.

FIG. 7 is a schematic structural diagram of a storage system according to an embodiment of the present disclosure. The storage system shown in FIG. 7 may be the third storage device 130 in the level-2 site 13 shown in FIG. 1. The following describes the storage system shown in FIG. 7 still with reference to FIG. 1. As shown in FIG. 7, the storage system 70 may include:

a receiving module 702, configured to receive replication information sent by a first storage system 33, where the replication information is used to indicate data that needs to be replicated by the first storage system 33 to the third storage device 130 in a current replication task, the first storage system 33 includes at least a first storage device 110 and a second storage device 120, and the first storage device 110 and the second storage device 120 store same data; and a sending module 704, configured to send a first acquisition request to the first storage device 110 according to the replication information, where the first acquisition request includes information about data that needs to be acquired by the storage system 70 from the first storage device 110 in the current replication task. It should be noted that, in a case in which the first storage device 110 includes multiple data volumes, the information, which is included in the first acquisition request, about the requested data includes at least an identifier of a first source data volume in the first storage device and an address of the data requested by using the first acquisition request. The first source data volume stores the data that needs to be replicated by the first storage system 33 to the third storage device 130 in the current replication task.

The sending module 704 is further configured to send a second acquisition request to the second storage device 120 according to the replication information, where the second acquisition request includes information about data that needs to be acquired by the storage system 70 from the second storage device 120 in the current replication task, and the data requested by using the first acquisition request is different from the data requested by using the second acquisition request. It should be noted that, in a case in which the second storage device 120 includes multiple data volumes, the information, which is included in the second acquisition request, about the requested data includes at least an identifier of a second source data volume in the second storage device and an address of the data requested by using the second acquisition request. The second source data volume stores the data that needs to be replicated by the first storage system 33 to the third storage device 130 in the current replication task. Data stored in the first source data volume is the same as data stored in the second source data volume.

The receiving module 702 is further configured to receive data that is sent by the first storage device according to the first acquisition request, and receive data that is sent by the second storage device according to the second acquisition request.

It is understandable that, the replication information may be a replication bitmap, the replication bitmap may be obtained according to a differential bitmap of the first storage system 33 when the current replication task begins, and the differential bitmap is used to record information about data written to the first storage system 33 after a previous replication task of the current replication task begins and before the current replication task begins.

In still another situation, when both the first storage device 110 and the second storage device 120 include multiple data volumes, the receiving module 702 is further configured to receive a replication task start message sent by the first storage system 33, where the replication task start message carries the identifier of the first source data volume and the replication information that is determined according to the data stored in the first source data volume. The storage system 70 may further include:

a message processing module 708, configured to determine the second source data volume in the second storage device 120 and a destination data volume in the third storage device 130 according to the identifier of the first source data volume and a preset replication relationship. The replication relationship includes a correspondence among the first source data volume, the second source data volume, and the destination data volume, and the destination data volume is configured to store the data received by the storage system in the current replication task.

In still another situation, the storage system 70 may further include:

a determining module 706, configured to determine, according to the replication information and bandwidth of a link between the storage system 70 and the first storage device 110, the data that needs to be acquired from the first storage device 110, and determine, according to the replication information and bandwidth of a link between the storage system 70 and the second storage device 120, the data that needs to be acquired from the second storage device 120.

The sending module 704 may be specifically configured to send the first acquisition request to the first storage device according to the data that is determined by the determining module 706 and that needs to be acquired from the first storage device, and send the second acquisition request to the second storage device according to the data that is determined by the determining module 706 and that needs to be acquired from the second storage device.

In still another situation, the storage system 70 may further include:

an updating module 710, configured to: in a process of executing the current replication task, update the replication information according to the received data.

The storage system 70 provided by this embodiment of the present disclosure may execute the data replication methods described in the embodiments of FIG. 5, and FIG. 6a and FIG. 6b, for a detailed description of a function of each unit, reference may be made to descriptions in the method embodiments, and details are not described herein again.

It is understandable that the embodiment shown in FIG. 7 is merely exemplary. For example, the module division is merely logical function division and may be other division in actual implementation. For example, a plurality of modules or components may be combined or integrated into another device, or some features may be ignored or not performed. In addition, the displayed or discussed mutual couplings or direct couplings or communication connections may be implemented by using some communications interfaces. The indirect couplings or communication connections between the modules may be implemented in electronic, mechanical, or other forms.

Modules described as separate parts may or may not be physically separate, and parts displayed as modules may or may not be physical units, may be located in one position, or may be distributed on a plurality of network units. Some or all of the modules may be selected according to actual needs to achieve the objectives of the solutions of the embodiments.

An embodiment of the present disclosure further provides a computer program product for data processing, including a computer readable storage medium that stores program code, where an instruction included in the program code is used to perform the method and process of any one of the foregoing method embodiments. A person of ordinary skill in the art may understand that, the foregoing storage medium includes various non-transitory machine readable media that can store program code, such as a USB flash drive, a removable hard disk, a magnetic disk, an optical disc, a RAM, a SSD, or a non-volatile memory.

It should be noted that the embodiments provided in this application are merely exemplary. A person skilled in the art may clearly understand that, for the purpose of convenient and brief description, in the foregoing embodiments, the descriptions of the embodiments have their respective focuses. For a part that is not described in detail in an embodiment, reference may be made to related descriptions in other embodiments. Features disclosed in the embodiments, claims and accompanying drawings of the present disclosure may exist independently or exist as a combination. Features that are described in the embodiments of the present disclosure in a hardware manner may be executed by using software, and vice versa, and no limitation is made herein.

What is claimed is:

1. A data replication method, comprising:
   replicating, by a first storage device, a first portion of data indicated by a replication information to a destination storage device, wherein the replication information indicates that the data needs replicating to the destination storage device, wherein the replication information comprises:
   first replication sub-information that indicates the first portion of the data that needs replicating by the first storage device to the destination storage device, and
   second replication sub-information that indicates a second portion of the data that needs replicating by a second storage device to the destination storage device; and
   replicating, by the second storage device, the second portion of the data indicated by the replication information to the destination storage device during a process when the first storage device replicates the first portion of the data to the destination storage device, wherein the first storage device and the second storage device store the data, and the first portion and the second portion are different portions of the data.

2. The data replication method according to claim 1, wherein the replicating the first portion of data indicated by the replication information comprises:
   replicating, by the first storage device, the first portion of the data indicated by the replication information to a destination data volume in the destination storage device, wherein the first portion of the data indicated by the replication information is stored in a first source data volume; and wherein the replicating the second portion of the data indicated by the replication information comprises:

replicating, by the second storage device, the second portion of the data indicated by the replication information to the destination data volume in the destination storage device, wherein the second portion of the data indicated by the replication information is stored in a second source data volume; and wherein data stored in the first source data volume and data stored in the second source data volume are the same.

3. The data replication method according to claim 1, further comprising:

determining the first portion of the data and the second portion of the data, by the first storage device, according to bandwidth information of a link between the first storage device and the destination storage device and bandwidth information of a link between the second storage device and the destination storage device.

4. The data replication method according to claim 1, further comprising:

generating, by the first storage device, first replication progress information according to data that has been replicated;

sending, by the first storage device, the first replication progress information to the second storage device;

determining, by the second storage device, that the first storage device is faulty; and in response to the determination, replicating, by the second storage device to the destination storage device according to the first replication progress information and the replication information, data that has not been replicated by the first storage device.

5. The data replication method according to claim 1, wherein:

the first storage device and the second storage device have a synchronous replication relationship;

the first storage device and the destination storage device have a first asynchronous replication relationship; and the second storage device and the destination storage device have a second asynchronous replication relationship.

6. The data replication method according to claim 5, wherein:

both the first asynchronous replication relationship and the second asynchronous replication relationship are in an active state.

7. A data replication method comprising:

sending, by a destination storage device, a first acquisition request to a first storage device, wherein the first acquisition request includes information of a first portion of data, and wherein the first portion of the data needs being acquired from the first storage device;

sending, by the destination storage device, a second acquisition request to a second storage device, wherein the second acquisition request includes information of a second portion of the data, wherein the second portion of the data needs being acquired from the second storage device, and wherein the first storage device and the second storage device store the data;

receiving, by the destination storage device, the first portion of the data sent by the first storage device according to the first acquisition request; and receiving, by the destination storage device, the second portion of the data sent by the second storage device according to the second acquisition request while receiving the first portion of the data from the first storage device.

8. The method according to claim 7, wherein the information of the first portion of the data comprises an identifier of a first source data volume in the first storage device and an address of the first portion of the data; and the information of the second portion of the data comprises an identifier of a second source data volume in the second storage device and an address of the second portion of the data, wherein both the first source data volume and the second source data volume store the data that needs replicating to the destination storage device.

9. The method according to claim 7, wherein:

the information of the first portion of the data comprises address information of the first portion of the data; and the information of the second portion of the data comprises address information of the second portion of the data.

10. The method according to claim 7, wherein the sending a first acquisition request to the first storage device comprises:

sending, by the destination storage device, the first acquisition request to the first storage device according to the first portion of data that is determined according to bandwidth of a link between the destination storage device and the first storage device; and wherein the sending a second acquisition request to the second storage device comprises:

sending, by the destination storage device, the second acquisition request to the second storage device according to the second portion of the data that is determined according to bandwidth of a link between the destination storage device and the second storage device.

11. The method according to claim 7, wherein:

the first storage device and the second storage device have a synchronous replication relationship;

the first storage device and the destination storage device have a first asynchronous replication relationship; and the second storage device and the destination storage device have a second asynchronous replication relationship.

12. The method according to claim 11, wherein both the first asynchronous replication relationship and the second asynchronous replication relationship are in an active state.

13. The method according to claim 7, further comprising:

sending, by the destination storage device, a third acquisition request to the second storage device when the first storage device is faulty, wherein the third acquisition request includes information of data that has not been replicated by the first storage device; and receiving, by the destination storage device, data sent by the second storage device according to the third acquisition request.

14. A storage system, comprising a controller and a storage, wherein the controller is configured to:

send a first acquisition request to a first storage device, wherein the first acquisition request includes information of a first portion of data, and wherein the first portion of the data needs being acquired from the first storage device;

send a second acquisition request to a second storage device, wherein the second acquisition request includes information of a second portion of the data, wherein the second portion of the data needs being acquired from the second storage device, and wherein the first storage device and the second storage device store the data;

receive the first portion of the data sent by the first storage device according to the first acquisition request; and receive the second portion of the data sent by the second storage device according to the second acquisition request while receiving the first portion of the data from the first storage device.

15. The storage system according to claim 14, wherein:
the information of the first portion of the data comprises address information of the first portion of the data; and
the information of the second portion of the data comprises address information of the second portion of the data.

16. The storage system according to claim 14, wherein:
the information of the first portion of the data comprises an identifier of a first source data volume in the first storage device and an address of the first portion of the data; and
the information of the second portion of the data comprises an identifier of a second source data volume in the second storage device and an address of the second portion of the data,
wherein both the first source data volume and the second source data volume store the data that needs replicating to the storage system.

17. The storage system according to claim 14, wherein in being configured to send the first acquisition request to the first storage device, the controller is configured to:

send the first acquisition request to the first storage device according to the first portion of data that is determined according to bandwidth of a link between the storage system and the first storage device; and wherein in being configured to send the second acquisition request to the second storage device, the controller is configured to:

send the second acquisition request to the second storage device according to the second portion of the data that is determined according to bandwidth of a link between the storage system and the second storage device.

18. The storage system according to claim 14, wherein:
the first storage device and the second storage device have a synchronous replication relationship;
the first storage device and the storage system have a first asynchronous replication relationship; and
the second storage device and the storage system have a second asynchronous replication relationship.

19. The storage system according to claim 18, wherein both the first asynchronous replication relationship and the second asynchronous replication relationship are in an active state.

20. The storage system according to claim 14, the controller is further configured to:

send a third acquisition request to the second storage device when the first storage device is faulty, wherein the third acquisition request includes information of data that has not been replicated by the first storage device; and receive data sent by the second storage device according to the third acquisition request.

* * * * *